US011053966B2

(12) United States Patent
Carr et al.

(10) Patent No.: US 11,053,966 B2
(45) Date of Patent: Jul. 6, 2021

(54) SYSTEMS AND APPARATUSES FOR SUPPORTING A FASTENER

(71) Applicant: Bell Helicopter Textron Inc., Fort Worth, TX (US)

(72) Inventors: Timothy Brian Carr, Fort Worth, TX (US); Pawan Bangalore Sathyananda, Bangalore (IN); Sheshaprasad Hassan Subramanya, Bangalore (IN)

(73) Assignee: TEXTRON INNOVATIONS INC., Fort Worth, TX (US)

( * ) Notice: Subject to any disclaimer, the term of this patent is extended or adjusted under 35 U.S.C. 154(b) by 525 days.

(21) Appl. No.: 16/002,599

(22) Filed: Jun. 7, 2018

(65) Prior Publication Data

US 2019/0376539 A1    Dec. 12, 2019

(51) Int. Cl.
*F16B 5/02*    (2006.01)
(52) U.S. Cl.
CPC ..................................... *F16B 5/02* (2013.01)
(58) Field of Classification Search
CPC ........ F16B 5/02; F16B 33/002; F16B 39/108; F16B 37/14; F16B 39/02; F16B 39/10; B64C 1/00
See application file for complete search history.

(56) References Cited

U.S. PATENT DOCUMENTS

| 716,986 | A | | 12/1902 | Collins | |
|---|---|---|---|---|---|
| 2,409,209 | A | * | 10/1946 | Johnson | F16B 37/044 411/111 |
| 2,477,429 | A | * | 7/1949 | Arent | F16B 37/044 411/111 |
| 3,259,165 | A | * | 7/1966 | Tobian | F16B 37/044 411/85 |
| 3,935,787 | A | | 2/1976 | Fisher | |
| 4,488,844 | A | * | 12/1984 | Baubles | F16B 37/045 411/103 |

(Continued)

FOREIGN PATENT DOCUMENTS

| EP | 3578836 B1 | 5/2020 |
|---|---|---|
| FR | 3039230 A1 | 1/2017 |

(Continued)

OTHER PUBLICATIONS

80/20 Product Catalog 18, published 2012, Section 3, Fastening Options, pp. 221-260 (Year: 2012); duplicate electronic copy can be currently found online at http://www.gawirth.net/Fractional_Section_3_8020_Catalog_18.pdf.*

(Continued)

*Primary Examiner* — Eret C McNichols
*Assistant Examiner* — Ding Y Tan
(74) *Attorney, Agent, or Firm* — Patent Capital Group

(57) ABSTRACT

In some examples, an apparatus comprises a surface and at least one flange extending from the surface. The fitting is operable to rotate from a first angular position to a second angular position based on contact between the at least one flange and a fastener and a torque applied to the fastener. In the first angular position, a gap separates the at least one flange from a barrier. In the second angular position, the at (Continued)

least one flange prevents rotation of the fastener based on contact between the barrier and the at least one flange. In some embodiments, the at least one flange comprises a plurality of flanges.

18 Claims, 14 Drawing Sheets

(56) References Cited

U.S. PATENT DOCUMENTS

| | | | | |
|---|---|---|---|---|
| 5,624,319 | A * | 4/1997 | Golczyk | B21D 53/24 |
| | | | | 470/21 |
| 5,820,346 | A * | 10/1998 | Young | F01D 5/22 |
| | | | | 416/193 A |
| 6,146,071 | A * | 11/2000 | Norkus | F16B 37/044 |
| | | | | 296/187.09 |
| 8,177,466 | B2 * | 5/2012 | Csik | F16B 37/044 |
| | | | | 411/174 |
| 8,277,158 | B2 * | 10/2012 | Csik | F16B 37/046 |
| | | | | 411/111 |
| 8,353,649 | B2 * | 1/2013 | Csik | F16B 39/284 |
| | | | | 411/111 |
| 9,140,290 | B2 * | 9/2015 | Damm | F01D 9/02 |
| 9,156,538 | B1 | 10/2015 | Stern et al. | |
| 9,360,039 | B2 * | 6/2016 | Endt | B23K 31/02 |
| 9,435,369 | B2 * | 9/2016 | Deck | F16B 37/043 |
| 2013/0004259 | A1 | 1/2013 | Stewart | |
| 2014/0283363 | A1 * | 9/2014 | Wilkerson | B21D 39/00 |
| | | | | 29/525.02 |
| 2016/0327204 | A1 | 11/2016 | Mahoney | |
| 2017/0253006 | A1 * | 9/2017 | Lopez | B64D 11/00 |

FOREIGN PATENT DOCUMENTS

| | | |
|---|---|---|
| KR | 20070020875 A | 2/2007 |
| WO | 2013097109 A1 | 7/2013 |

OTHER PUBLICATIONS

80/20 Inc Youtube video: T-nuts overview https://www.youtube.com/watch?v=nK-DsJxAdwM1 (Year: 2014).*

80/20 Product Catalog 18, published 2012, Section 3, Fastening Options, pp. 221-260, hereinafter referred as "80/20 fastener catalog" (Year: 2012).*

EPO Examination Report issued in EP Application 18187283.9 dated Mar. 15, 2019, 6 pages.

EPO Search Report issued in EP Application 18187283.9 dated Mar. 1, 2019, 3 pages.

EPO Examination Report issued in EP Application 18187283.9 dated July 24, 2019, 3 pages.

Bell 525 Relentless (Product Diagram), Bell Helicopter, A Textron Company; Flight International from Flightglobal Tim Hall (FRAeS, Fort Worth, Texas), Reed Business Information, Published Nov. 12, 2014. (1 page).

Jerry, Dominic, "Analysis: Bell 525 Relentless Cutaway and Technical Description", Flight Global, Flight International, Bell Helicopter, Published Nov. 12, 2014. (8 pages).

* cited by examiner

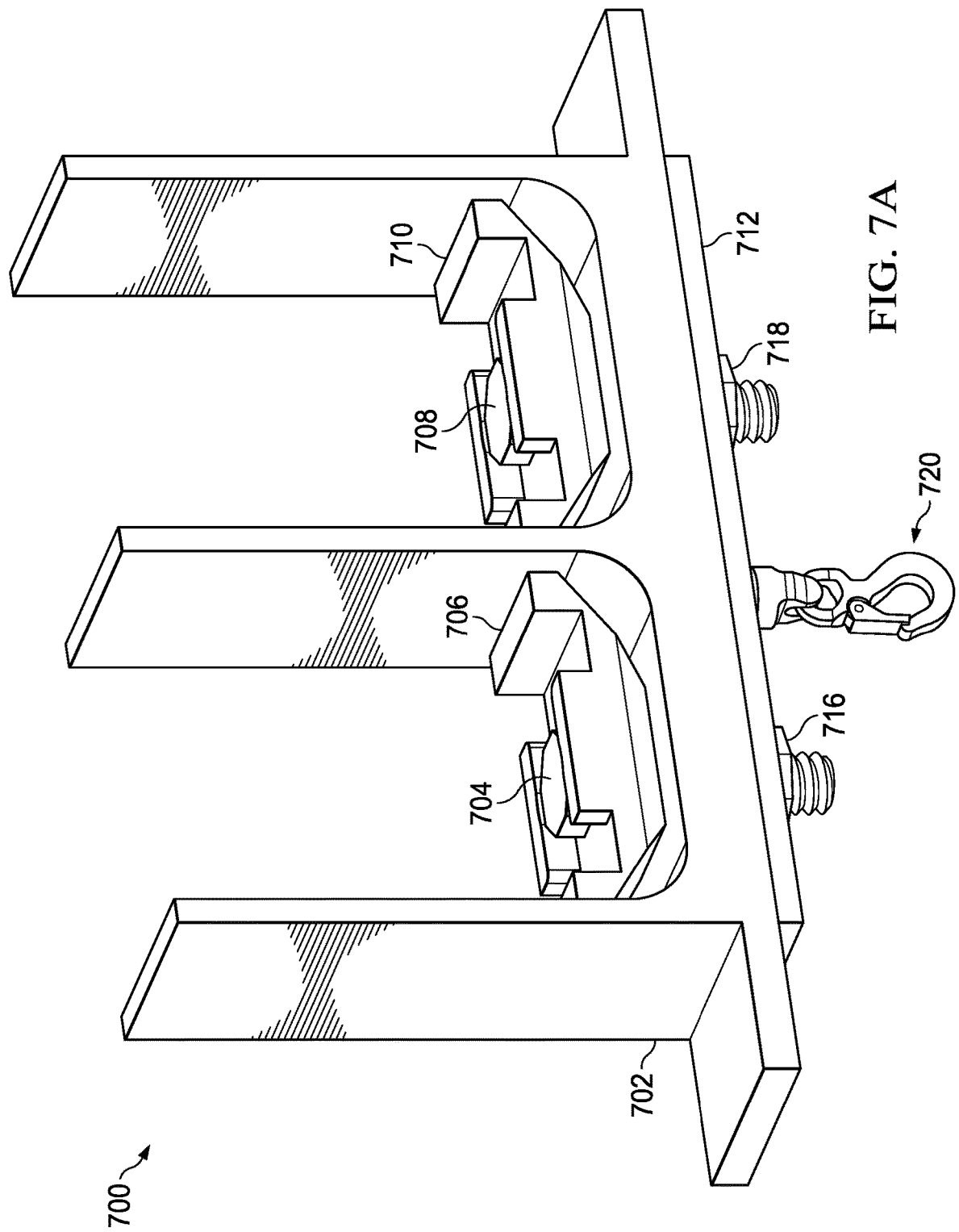

SYSTEMS AND APPARATUSES FOR SUPPORTING A FASTENER

TECHNICAL FIELD

This disclosure relates generally to attachment systems, and more particularly, though not exclusively, to systems and apparatuses for supporting a fastener.

BACKGROUND

Aircraft include many components, which may be integral to the aircraft and/or attached to the aircraft. An aircraft includes many fasteners to attach such components to the aircraft. Often, a torque is applied to a fastener to attach the component to the aircraft. For example, a tool (such as a wrench) is used to hold a head of bolt, while the torque is applied to a nut that is to be attached to a shaft of the bolt. The tool provides a reaction to prevent the bolt from spinning while the torque is applied to the nut. However, installing bolts and other fasteners in this manner can be challenging, especially when the fasteners are hard to access.

SUMMARY

In some examples, a fitting includes a surface and at least one flange extending from the surface. The fitting is operable to rotate from a first angular position to a second angular position based on contact between the at least one flange and a fastener and a torque applied to the fastener. In the first angular position: a gap separates the at least one flange from a barrier. In the second angular position: the at least one flange prevents rotation of the fastener based on contact between the barrier and the at least one flange. In some embodiments, the at least one flange includes a plurality of flanges.

In other examples, an aircraft includes an aircraft component, a fastener to attach the aircraft component to the aircraft, and an apparatus operable to support the fastener. The apparatus includes a surface and at least one flange extending from the surface. The apparatus is operable to rotate from a first angular position to a second angular position based on contact between the at least one flange and the fastener and a torque applied to the fastener. In the first angular position: a gap separates the at least one flange from a barrier. In the second angular position: the at least one flange is operable to prevent rotation of the fastener based on contact between the barrier and the at least one flange.

BRIEF DESCRIPTION OF THE DRAWINGS

FIGS. 6A, 6B, 7A and 7B illustrate various systems (including an attachment) for supporting a fastener in accordance with some embodiments.

DETAILED DESCRIPTION

Figure 1A:
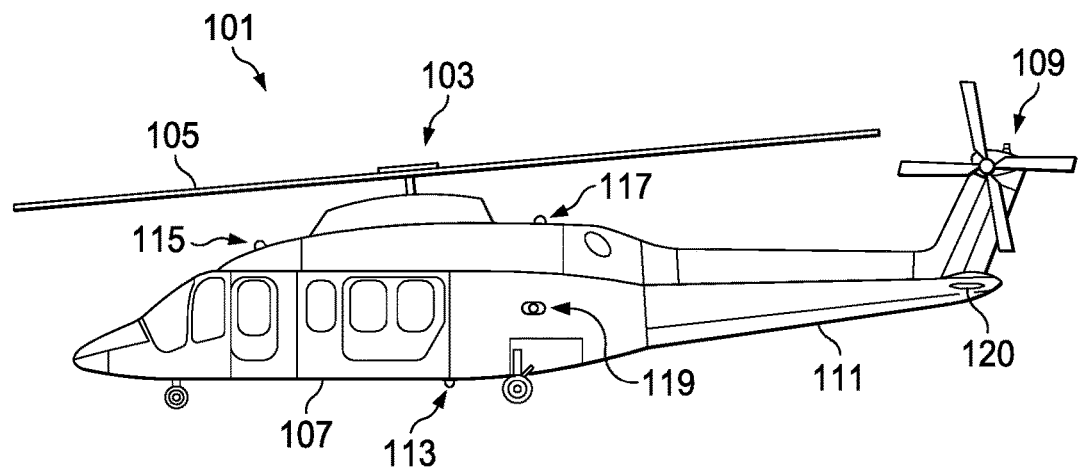
FIGS. 1A, 1B, and 2 illustrate example aircraft in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached Figures.

Figure 1B:
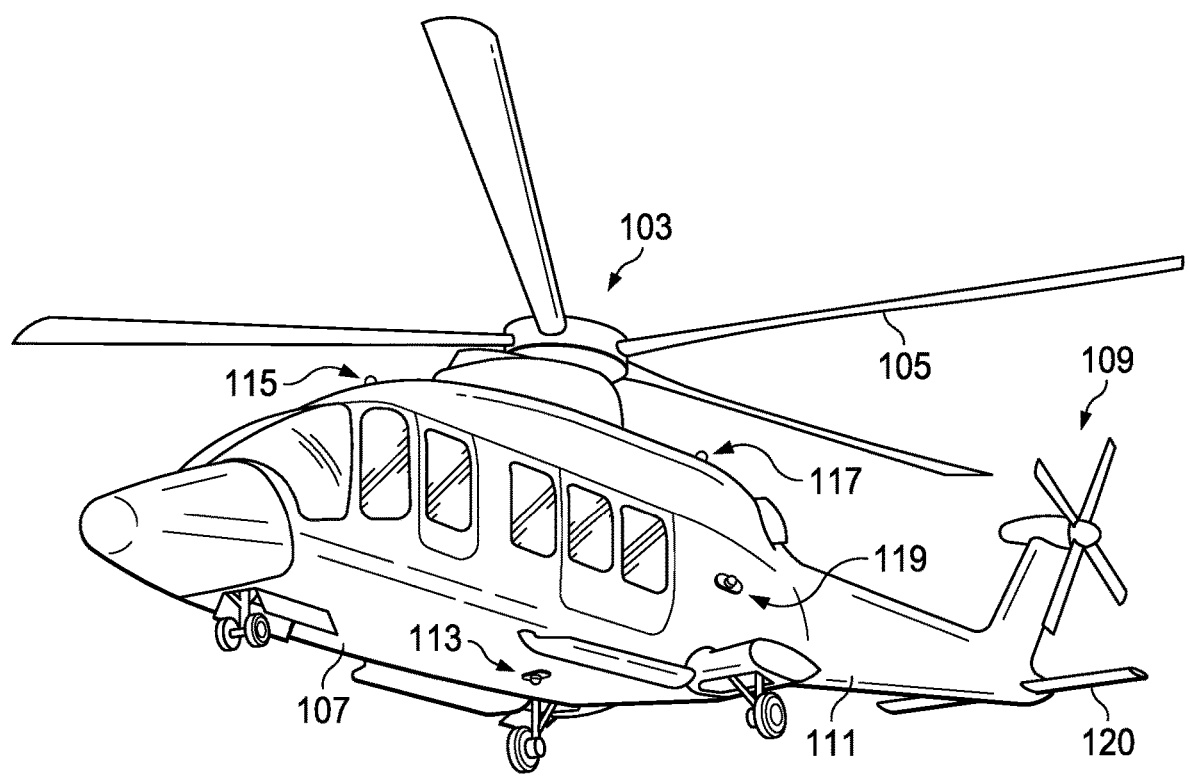

FIGS. 1A and 1B illustrate an exemplary aircraft, which in this case is a rotorcraft 101. FIG. 1A illustrates a side view of the rotorcraft 101, while FIG. 1B illustrates a perspective view of the rotorcraft 101. Rotorcraft 101 includes an airframe (hidden beneath an outer mold line of the rotorcraft) and a rotor system 103 coupled to the airframe. The rotor system 103 includes with a plurality of rotor blades 105. The pitch of each rotor blade 105 can be managed or adjusted in order to selectively control direction, thrust, and lift of the rotorcraft 101. Rotorcraft 101 further includes a fuselage 107, tail rotor or anti-torque system 109, an empennage 111, and a tail structure 120, each of which is attached to the airframe. The tail structure 120 may be used as a horizontal stabilizer. Torque is supplied to rotor system 103 and anti-torque system 109 using at least one engine. The rotorcraft 101 includes several external components 113, 115, 117, and 119, each of which is attached to an external surface of the rotorcraft 101 by at least one fastener that extends from the inside to the outside of the rotorcraft 101. The external component 113 is attached to the bottom of the rotorcraft 101. The external components 115 and 117 are attached to the top of the rotorcraft 101. The external component 119 is attached to a side of the rotorcraft 101.

Figure 2:
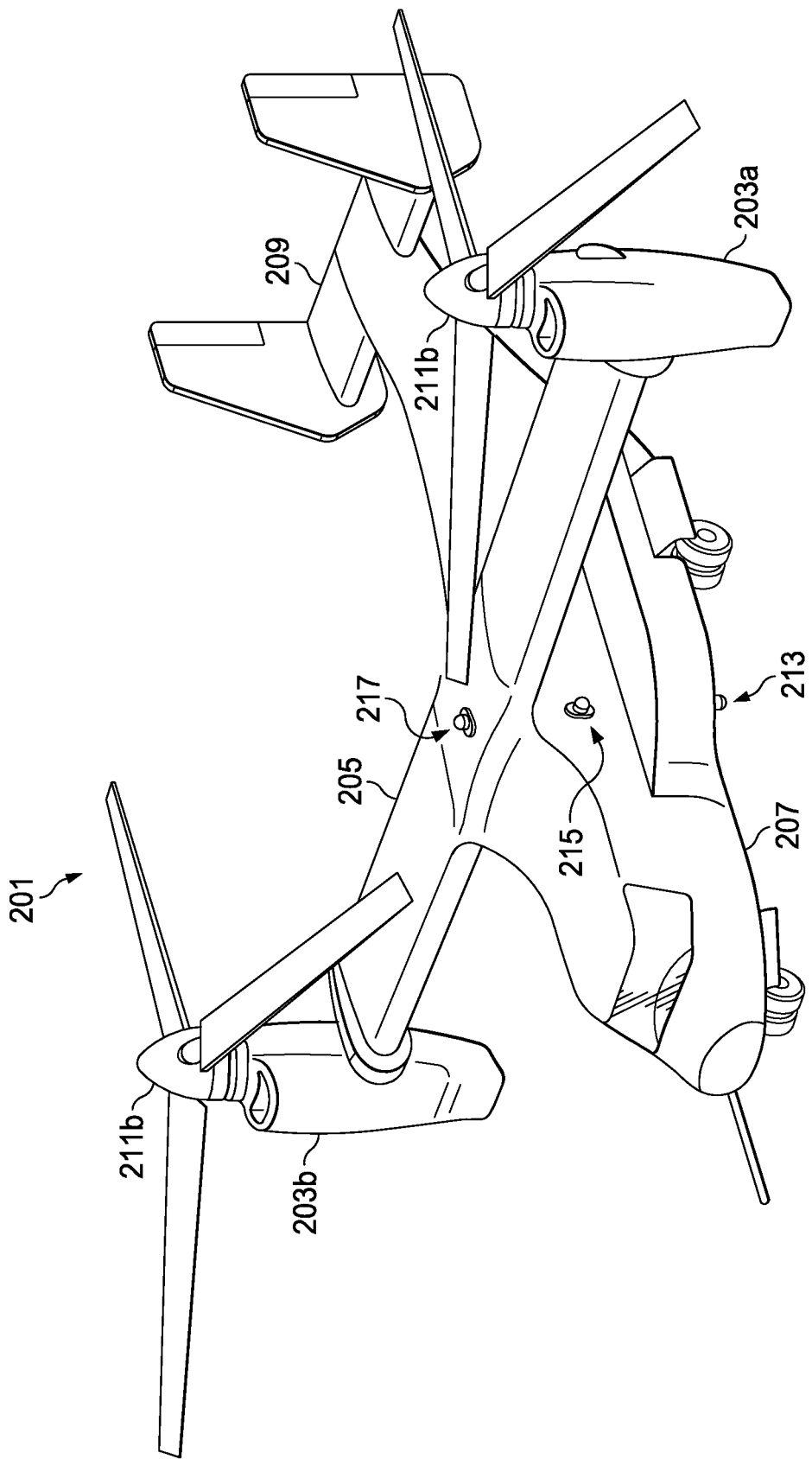

FIG. 2 illustrates a perspective view of an example an aircraft, which in this case is a tiltrotor aircraft 201. Tiltrotor aircraft 201 can include nacelles 203a and 203b, a wing 205, a fuselage 207, and a tail member 209, each of which is coupled to an airframe of the tiltrotor aircraft 201 (hidden beneath the outer mold line of the tiltrotor aircraft 201). Each nacelle 203a and 203b can include an engine and gearbox for driving rotor systems 211a and 211b, respectively. Nacelles 203a and 203b are each configured to rotate between a helicopter mode, in which the nacelles 203a and 203b are approximately vertical, and an airplane mode, in which the nacelles 203a and 203b are approximately horizontal. The tiltrotor aircraft 201 includes several external components 213, 215, and 217, each of which is attached to an external surface of the tiltrotor aircraft 201 by at least one fastener that extends from the inside to the outside of the tiltrotor aircraft 201. The external component 213 is attached to the bottom of the rotorcraft 101. The external component 217 is attached to the top of the tiltrotor aircraft 201. The external component 215 is attached to a side of the tiltrotor aircraft 201.

It should be appreciated that the rotorcraft 101 of FIGS. 1A and 1B and tiltrotor aircraft 201 of FIG. 2 are merely illustrative of a variety of aircraft that can be used to implement embodiments of the present disclosure. Other aircraft implementations can include, for example, fixed wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

A "fastener" is inclusive of a hardware device operable to mechanically join (e.g., connect, couple or otherwise attached) two or more components to one another. Some fasteners (e.g., removable fasteners) can be uncoupled to release the two or more components from one another. A fastener can include members (e.g., a nut, a head, and the like) that oppose one another and can be drawn toward or pushed away from one another from opposite ends of the fastener based on a threaded interface (e.g., interlocking threads). When a fastener is installed (or fastened) (e.g., as the (opposing) members are drawn toward one another) it applies a compressive, mechanical force that joins the two or more components to one another. The two or more components are, at least in part, enclosed between the opposing members of the fastener. A fastener is inclusive of, e.g., a bolt and a nut. A bolt can include a head and a shaft (attached to the head) having external threads. The nut is operable to couple to the shaft and to oppose the head of the bolt along a length of the shaft (e.g., the head is located at one end of the shaft and the nut is coupled at an opposite end of the shaft). The nut can include an opening having internal threads. The threads on the nut and the threads on the bolt interlock with another. While the threads are interlocked, the nut moves axially along the shaft of the bolt (e.g., toward or away from the head of the bolt) based on a relative rotation between the bolt and the nut. As another example, a fastener may include a threaded shaft and two or more nuts (e.g., one nut on each end of the shaft). In such an example, each nut may be a head of the fastener. The shaft has external threads that interlock with threads on each of the nuts. While the threads on each nut are interlocked with threads on the shaft, each nut moves axially along the shaft (e.g., toward or away from one another) based on a relative rotation between the shaft and each nut. A fastener may include metal (e.g., steel, titanium, aluminum, etc.) and/or another rigid material.

Some aircraft components (e.g., external components 113, 115, 117, 119, 213, 215, and 217) are attached to an aircraft with fasteners that have two or more portions that are challenging to simultaneously access (e.g., hard to install, remove, repair, maintain, and/or otherwise adjust the fastener). Each fastener may be challenging to access due to one portion of the fastener being on an inside of the aircraft while another portion of the fastener being on an outside of the aircraft. For example, a head of a fastener may be located on an inner side of the aircraft (e.g., inboard) while a shaft of the fastener extends through an opening in a surface of the aircraft to an outer side (e.g., outboard) of the aircraft. Alternatively, the head of a fastener may be located on an outer side of the aircraft (e.g., outboard) while a shaft of the fastener extends through an opening in the surface of the aircraft to the inner side (e.g., inboard) of the aircraft. In either case, the two portions of the fastener being on opposite sides of the surface of the aircraft can make it challenging to access the two portions simultaneously (e.g., because a single person may be unable to access both sides of the surface simultaneously). This may create a situation where an aircraft maintenance person must first go inside of the aircraft to set a bolt in place and subsequently go outside of the aircraft to install a nut on the shaft of the bolt. Because of the numerous internal cavities and compartments on an aircraft, some locations on an aircraft are impractical or virtually impossible for a single person to have physical access to both inside and outside simultaneously. Unless the location is near an opening large enough to allow a person to reach through with a tool to hold the fastener, such access by a single person may be impossible.

Installing a fastener can be hindered by the fact that various portions of a fastener are challenging to simultaneously access. For some fasteners that have two or more portions, installing the fastener requires simultaneous access to each of the two or more portions, for example, to hold one portion in place while applying a torque to the other portion may require a maintenance person to have simultaneous access to the inside and the outside of an aircraft. When such simultaneously access by a single person impractical, forces applied to install a fastener can hinder the installation process. Consider, as an illustrative example, that the fastener includes a nut and a bolt. In some situations, a force required to create contact between the nut and a shaft of the bolt pushes the bolt out of the opening, which may result in a problem of the bolt falling out of the opening since no one and/or nothing is on the other side holding the bolt in place. In addition, a torque applied to the nut in an attempt to install the nut on the shaft of the bolt may cause the bolt to rotate simultaneously with the nut, causing the bolt merely to spin simultaneously with the nut since no one and/or nothing is on the other side holding the bolt in place. Such simultaneous rotation of the bolt and the nut prevents the relative rotation needed to cause the nut and the bolt to interlock and create the mechanical force to join the components to one another. The simultaneously rotation of the bolt and the nut is undesirable because it prevents the nut and the bolt from creating the desired mechanical connection.

The challenges associated with installing a fastener can be further exacerbated by a size of a space in which a fastener is located on an aircraft. For example, even when the various portions of the fastener are accessible by a single person, if the fastener is installed in a small, hard to reach compartment, such as an internal storage compartment, a fuel tank, a confined space, and the like, then installing the fastener may still be challenging for the person performing the installation because the person and or tools may not be able to reach the location.

A possible solution to the above issues is to have two people work on the fastener: one person—located on the inside of the aircraft—attends to one portion of the fastener (e.g., a head of the fastener) while another person—located on the outside of the aircraft—attends another portion of the fastener (e.g., a nut on a shaft of the fastener). However, requiring two people each time the fastener is accessed can be costly and inefficient.

Another possible solution to the above issues is to use a backup wrench, which can prevent rotation of a fastener by temporarily fitting over top of the fastener and creating contact with an adjacent fastener. A backup wrench maintains attachment to and limits the rotation of the fastener based on threshold amount of torque, which maintains a mechanical connection between the fastener backup wrench. If and when the torque is released (e.g., drops below the threshold amount of torque), the backup wrench may easily disconnect from the fastener. This design enables the backup wrench to temporarily limit rotation of the fastener while being easily removable so that the backup wrench can be repeatedly used to install multiple fasteners. This design also can make backup wrenches a poor choice for long-term installation on a fastener, since a loss of torque could cause the backup wrench to detach from the fastener. As an example, aircraft sometimes vibrate during flight. Such vibrations can loosen the fastener and cause the backup wrench to detach from the fastener. If the backup wrench detaches during flight, the backup wrench could become a projectile and potentially cause damage to the aircraft and/or bodily harm to people therein. In addition, since backup wrenches fit over top of a fastener, they may not help to prevent a fastener from falling and/or being pushed out.

The systems, apparatuses, and fittings described in the present disclosure address the challenges discussed above (as well as other challenges). In some examples, a fitting includes a surface and at least one flange extending from the surface. The fitting is operable to rotate from a first angular position to a second angular position based on contact between the at least one flange and a fastener and a torque applied to the fastener. In the first angular position, a gap separates the at least one flange from a barrier. In the second angular position, the at least one flange prevents rotation of the fastener based on contact between the barrier and the at least one flange. In some embodiments, the at least one flange includes a plurality of flanges. Advantageously, the fitting resists the torque and holds the fastener in place, thereby preventing the problem of the fastener merely spinning based on the torque. Other aspects of the systems, apparatuses, and fittings are discussed with reference to the Figures. For an aircraft component that is to be attached using a fastener where a head of the fastener is located in a hard to access interior location (e.g., under floor panels, seats, and/or power equipment), the fitting simplifies attaching the aircraft component from the exterior without requiring access to the interior location of the aircraft (e.g., without removing the floor panels, the seats, and/or the power equipment) to access the head of the fastener. This fitting can reduce direct operating cost of the aircraft by such aircraft components to be removed without significant downtime.

Figure 3A:
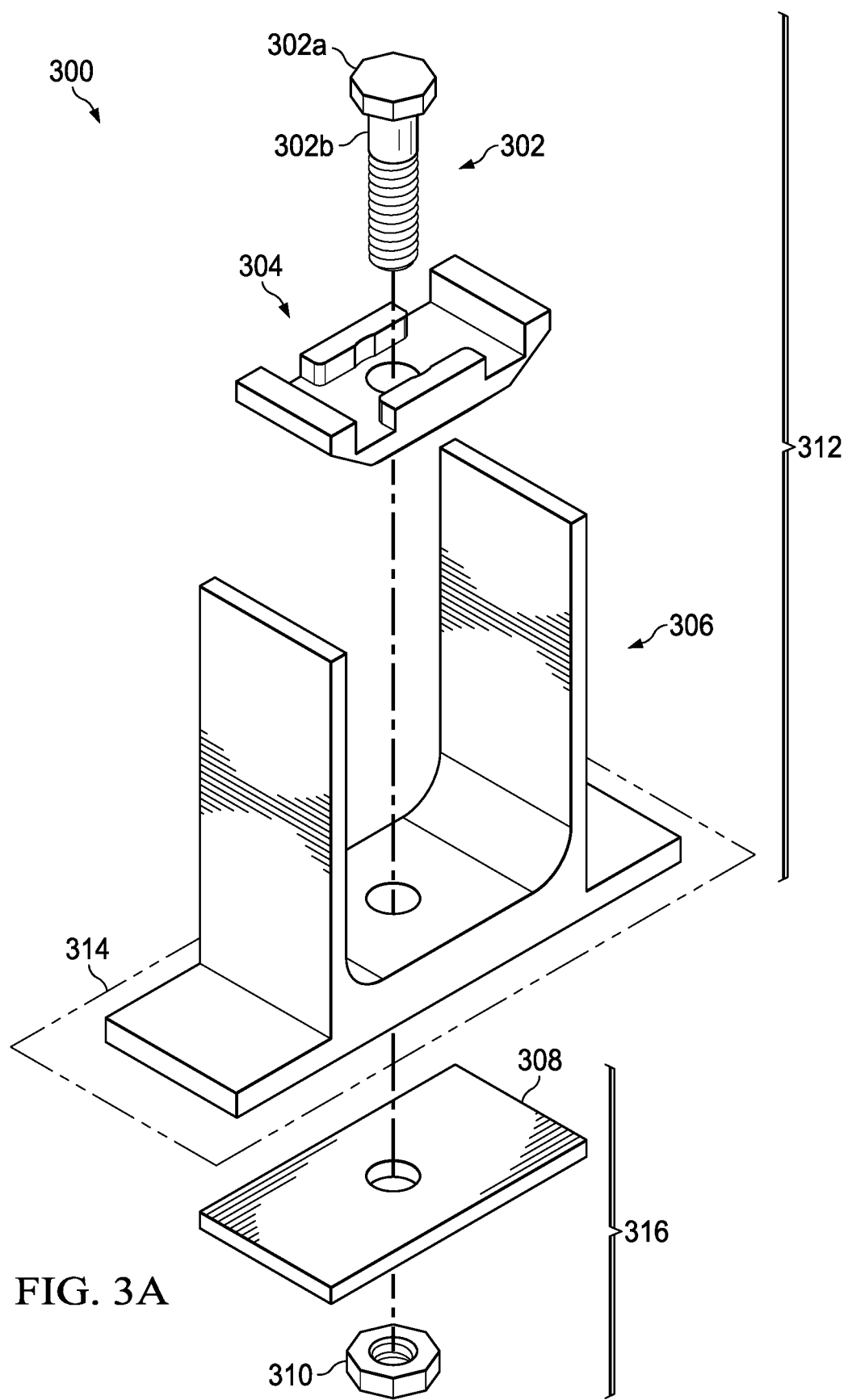
FIGS. 3A, 3B, 3C, 3D, and 3E illustrate various views of a system for supporting a fastener in accordance with some embodiments.

FIG. 3A is an exploded diagram of a system 300 for supporting a fastener in accordance with some embodiments. The system 300 includes a bolt 302, a fitting 304, a portion of an aircraft 306, an aircraft component 308, and a nut 310. As discussed above, a technician may attach one or more components (e.g., external components 113, 115, 117, 119, 213, 215, and 217 of FIGS. 1A, 1B, and 2) to an aircraft using a fastener. In such an example, the portion of an aircraft 306 corresponds to a relatively fixed structure of the aircraft (e.g., a barrier); the aircraft component 308, which is to be installed, corresponds to one or more of the external components 113, 115, 117, 119, 213, 215, and 217; and the bolt 302 and the nut 310 correspond to the fastener used to attach components to the aircraft. In the system 300, the bolt 302 and the nut 310 are used to attached the aircraft component 308 (i.e., the aircraft component to be installed) to the portion of an aircraft 306.

The bolt 302 comprises a head 302a and a shaft 302b, which extends from the head 302a. The shaft 302b includes threads on an external surface; the threads span at least a portion of a length of the shaft 302b and extend to an end of the shaft 302b (e.g., an end opposite the head 302a). The nut 310 comprises a faceted external surface and an opening, which is offset from the faceted external surface. Walls of the opening include threads. The internal threads on the nut 310 interlock with the external threads on the bolt 302. Each of fitting 304, the portion of the aircraft 306, and the aircraft component 308 comprises an opening through which the shaft 302b of the bolt 302 can extend. An outer mold line 314 of the aircraft separates a set of inboard parts 312 (i.e., the bolt 302, the fitting 304, and the portion of the aircraft 306) and a set of outboard parts 316 (i.e., the aircraft component 308 and the nut 310).

Figure 4A:
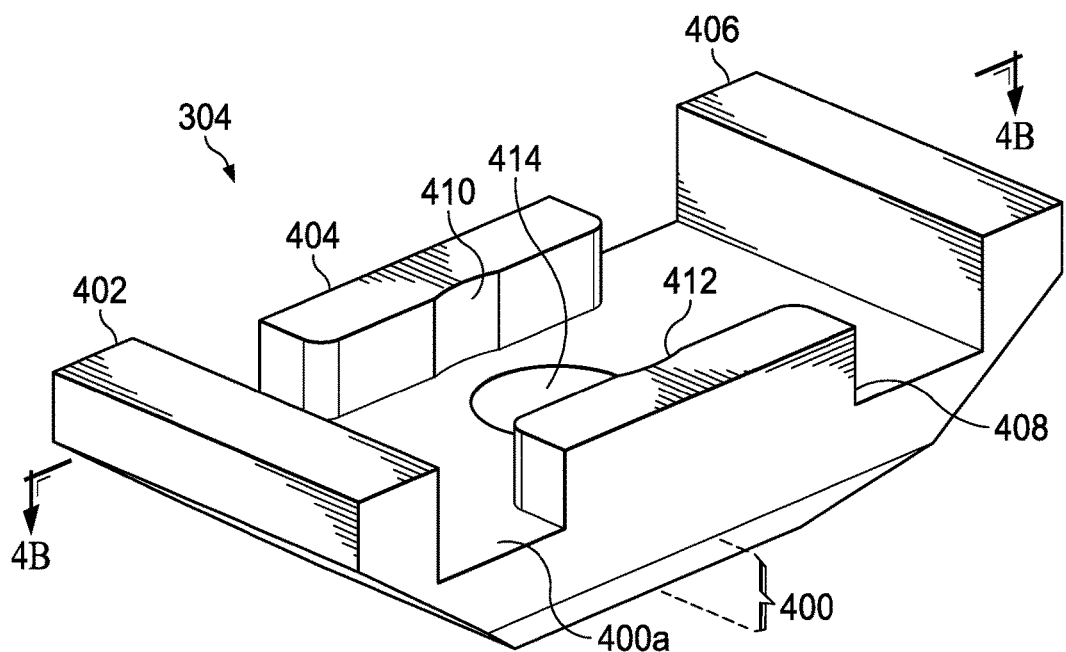
FIGS. 4A, 4B, 4C, and 4D illustrate various views of an apparatus for supporting a fastener in accordance with some embodiments.
Figure 4B:
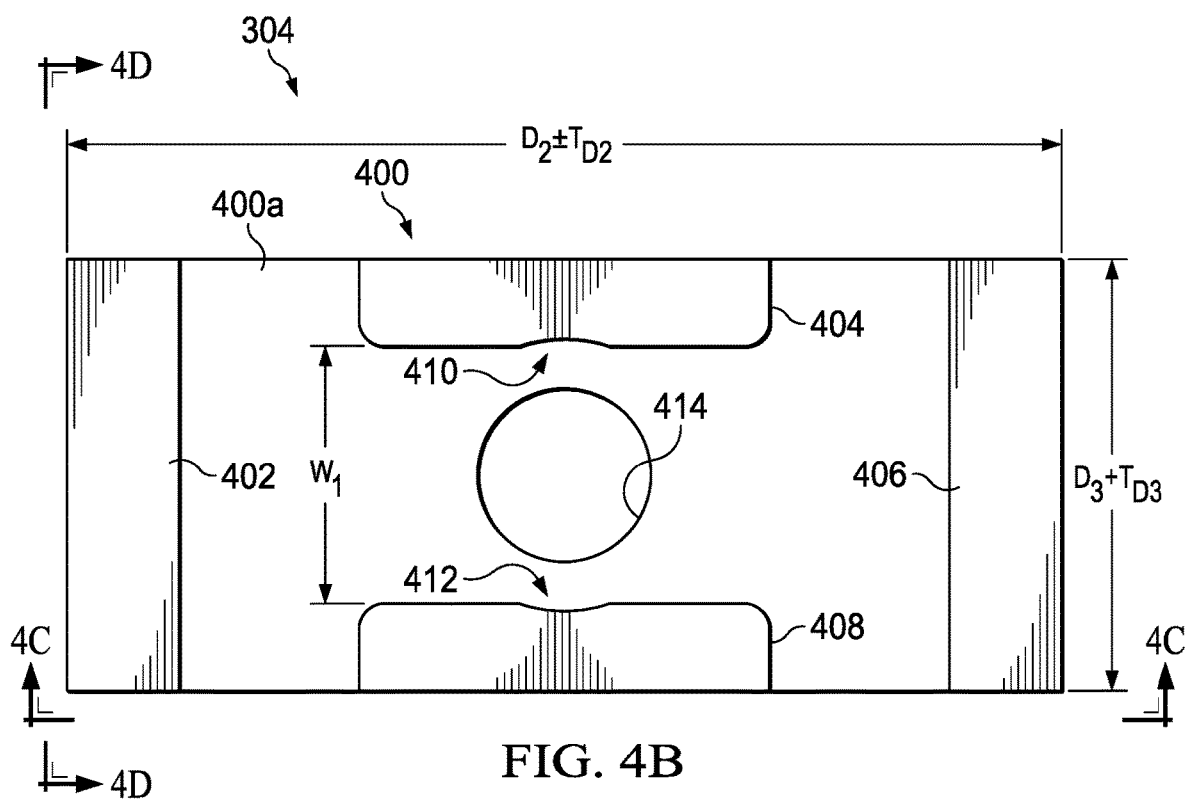
Figure 4C:
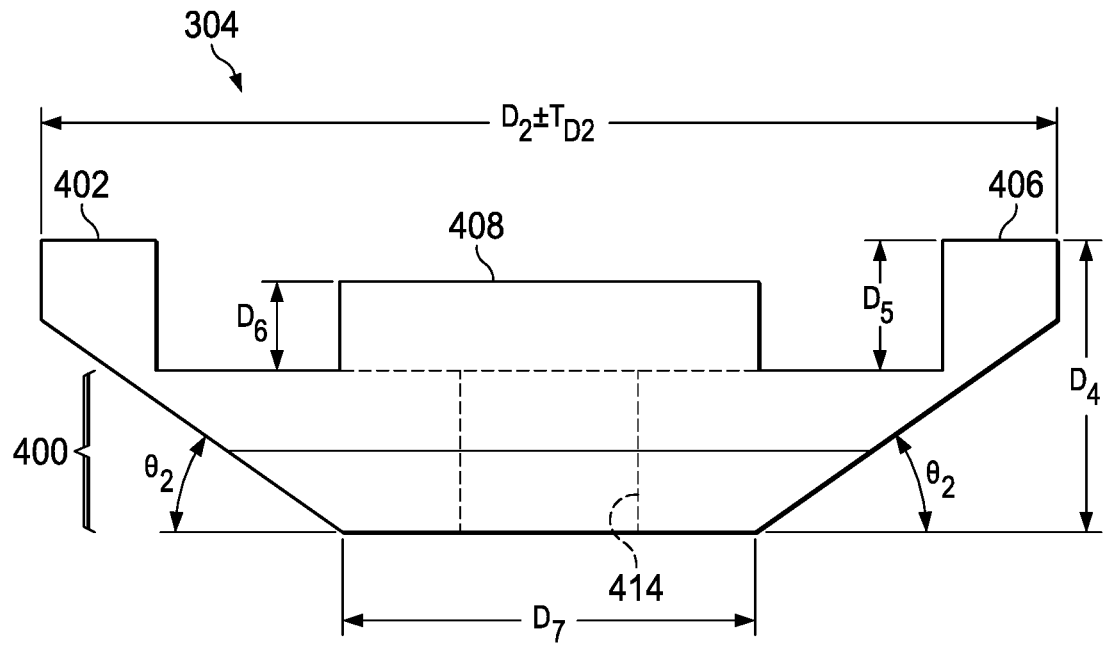
Figure 4D:
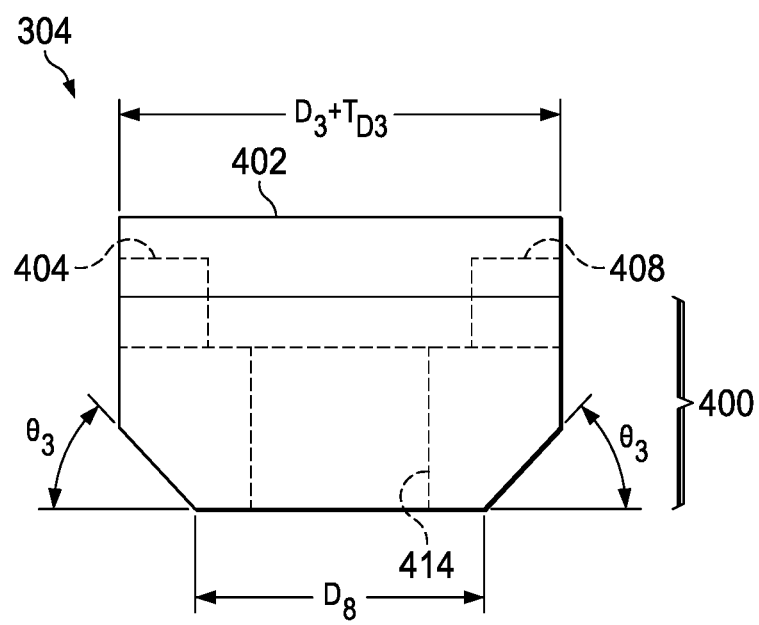

The fitting 304 is configured to support at least a portion of a fastener (e.g., the bolt 302 of FIG. 3A) and is configured to limit rotation of the fastener (e.g., when a torque is applied to the fastener). FIGS. 4A, 4B, 4C, and 4D illustrate, among other things, several features of the fitting 304 (FIG. 3A) that facilitate supporting and/or limiting the rotation of such a fastener. FIG. 4A is a three-dimensional view of the fitting 304. FIG. 4B is a view of a top view of the fitting 304 (e.g., as generally indicated by the arrows labeled "4B" in FIG. 4A). FIGS. 4C and 4D are side views of the fitting 304 (e.g., as generally indicated by the arrows labeled "4C" and "4D" respectively in FIG. 4B). The fitting 304 comprises a body 400 and a plurality of flanges 402-408 extending from a surface 400a (e.g., a support surface) of the body 400. An opening 414 extends through the body 400. The flanges 402 and 406 extend above the surface 400a of the body 400 by a dimension $D_5$. The flanges 402 and 406 are configured to contact an adjacent barrier. The flanges 404 and 408 extend above the surface 400a of the body 400 by a dimension $D_6$. The flanges 404 and 408 are configured to grasp at least a portion of a fastener, such as a head of the fastener. The flange 404 includes a notch 410. The flange 408 includes a notch 412. Notches 410 and 412 provide clearance for a washer and/or an integrated washer feature on the bolt. This can prevent the washer from damaging the fillet at the base of the flanges 404 and 408. In some embodiments, the flanges 402-408 are connected to one another to form a single undulating flange around the perimeter of the fitting 304. The fitting 304 has overall dimensions including a dimension $D_2$, a dimension $D_3$, and a dimension $D_4$. Each of the dimensions may include a manufacturing tolerance. For example, the dimension $D_2$ includes a tolerance $T_{D2}$. The dimension $D_3$ includes a tolerance $T_{D3}$. Each corner at the top of the fitting 304 may be rounded at a radius $R_1$ which includes a tolerance $T_{R1}$. The fitting 304 tapers, at an angle $\theta_2$, from the dimension $D_2$ down to a dimension $D_7$. In addition, the fitting 304 tapers, at an angle $\theta_2$, from the dimension $D_3$ down to a dimension $D_8$. Advantageously, the larger upper portion of the fitting 304 accommodates the head of a fastener and the tapered lower portion provides a clearance between adjacent components (e.g., to avoid prematurely making contact with the adjacent components during rotation of the fitting 304). In addition, the lower portion provides structural support for the forces that the fitting 304 supports during operation (e.g., a weight of an external component and/or compressive forces from a fastener). The fitting 304 can be manufactured by machining the surfaces, e.g., from a solid block of material. The fitting 304 may be fabricated from metal, such as steel, titanium, or aluminum, for example, and/or another rigid material.

When the fitting 304 (or other fittings disclosed herein) supports a fastener, a head of the fastener (or a nut) nests between the flanges 404 and 408 while a shaft of the fastener extends through the opening 414. In such a configuration, a bottom surface of the head 302a rests on the surface 400a and sides of the head 302a contact the flanges 404 and 408. The surface 400a supports the head of the bolt. The flanges are operable to contact the head of the fastener. Any torque applied to the shaft 302b of the fastener causes the head of the fastener to bear against the flanges. This bearing contact with the flanges substantially inhibits the fastener from rotating independently of the fitting 304. Instead, the fitting 304 and the fastener rotate simultaneously with one another. When the fitting 304 and the supported fastener are installed on an aircraft near a barrier, the simultaneous rotation of the fitting 304 and the fastener causes the fitting and the supported fastener to rotate to an angular position at which the fitting 304 contacts the barrier and thereby limits rotation of the fastener by holding the fastener in place while the torque is applied to the fastener. A process of installing a fastener based on support provided by the fitting 304 is described in further detail with respect to FIGS. 3B-3E.

Figure 3B:
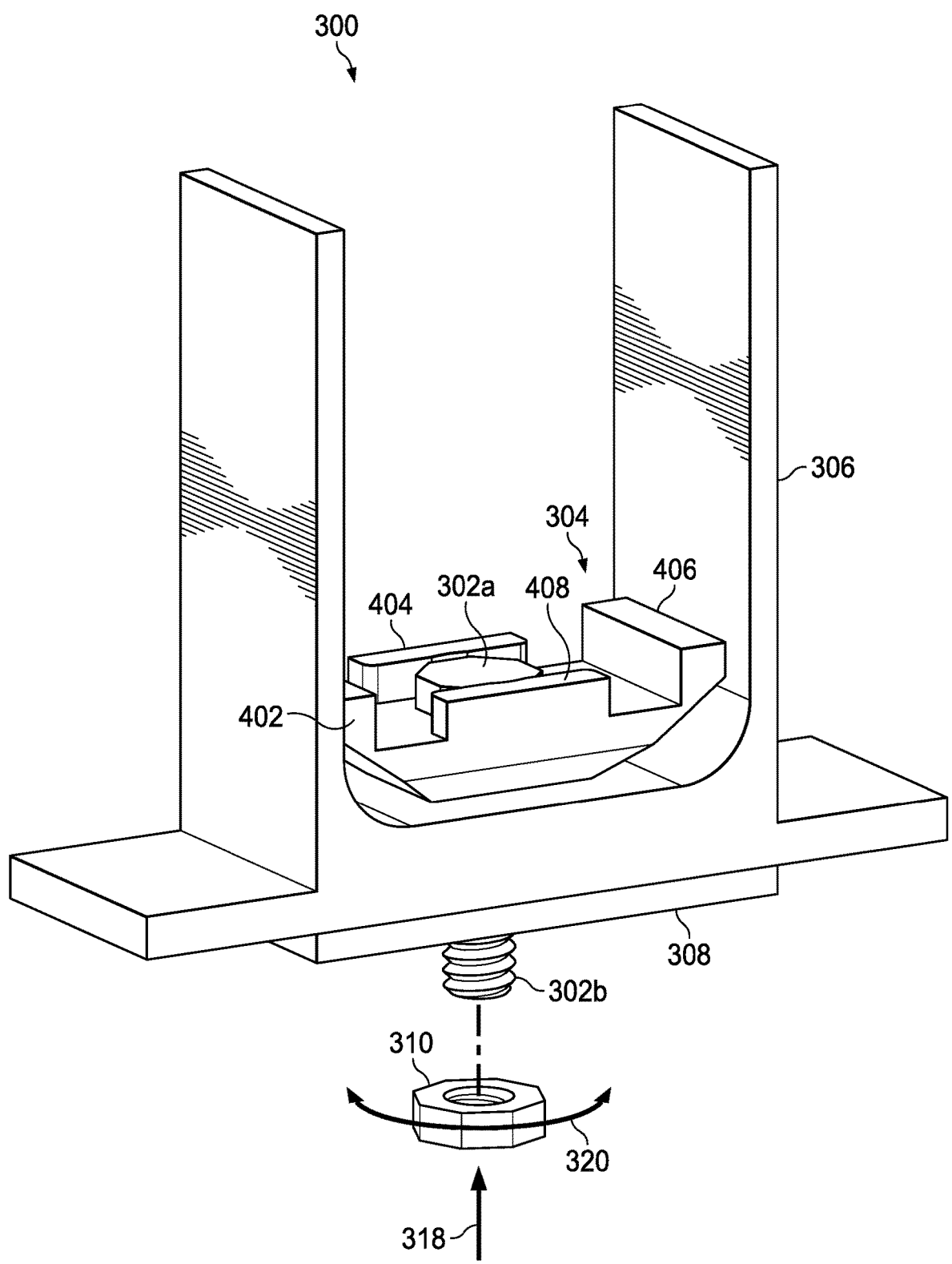
Figure 3C:
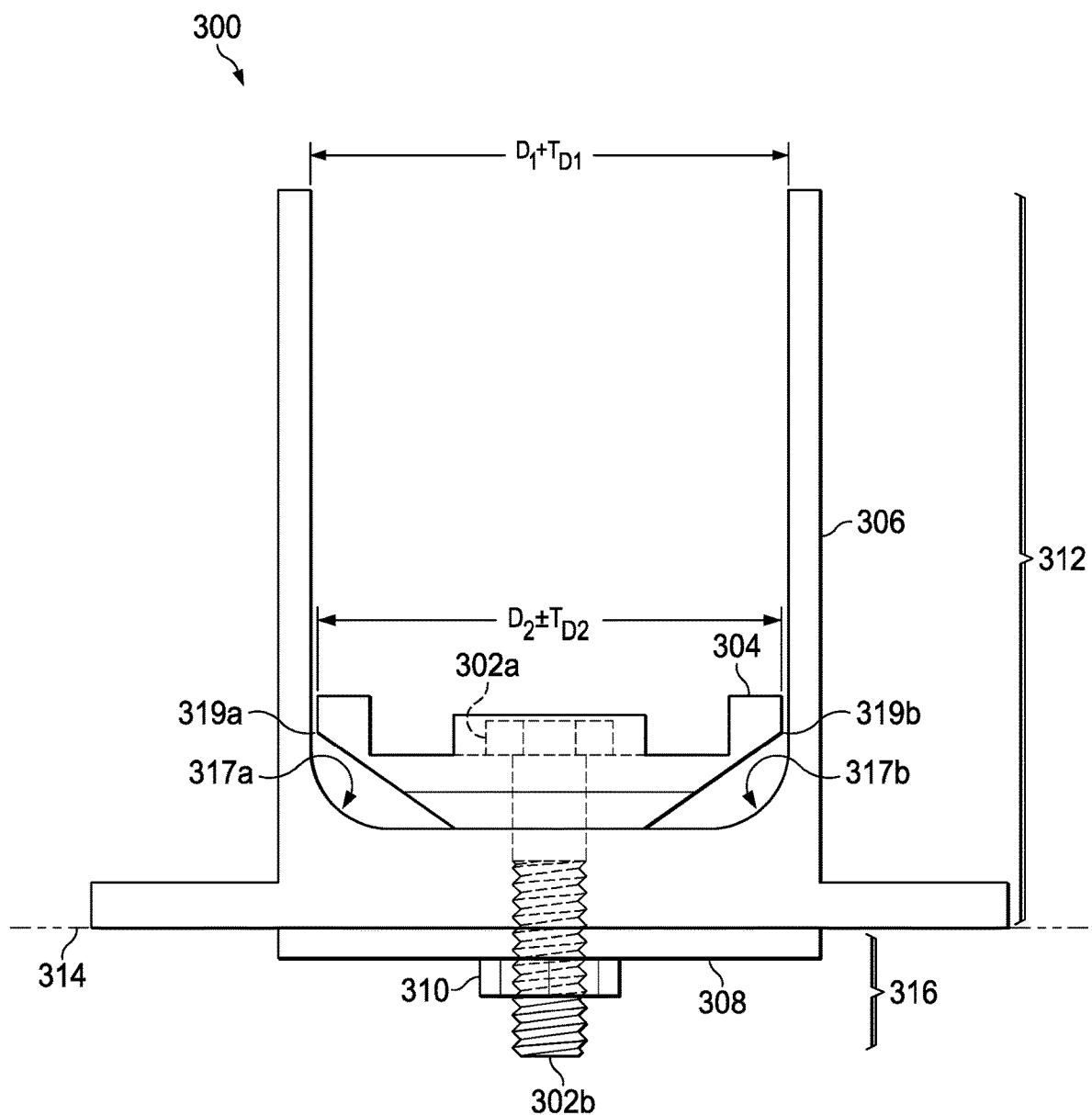
Figure 3D:
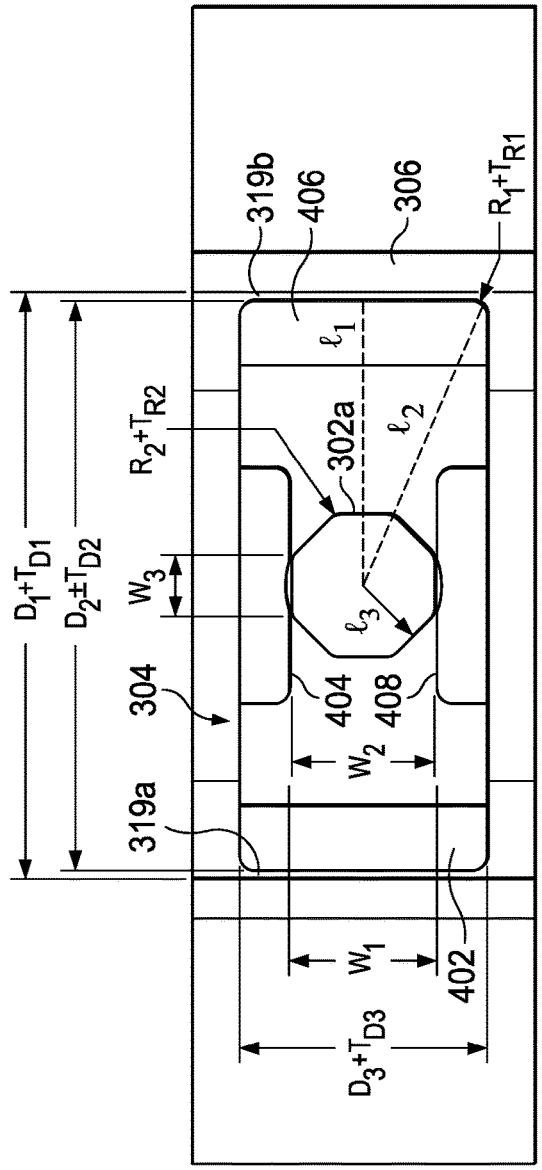

FIG. 3B illustrates the system 300 (FIG. 3A) partially assembled and installed on the aircraft wherein the fitting 304, at least in part, supports the bolt 302; the nut 310 is not installed. The fitting 304 is described with reference to FIGS. 4A-4D. The bolt 302 extends through openings in each of the fitting 304, the portion of the aircraft 306, and the aircraft component 308. To install the nut 310, a force 318 is applied to move the nut 310 into contact with threads on the shaft 302b and a torque 320 (e.g., a torsional force) is applied to the nut to engage the threads on the nut 310 with the threads on the shaft 302b. The torque 320 is illustrated with two arrows to indicate that the torque can be applied in either of two rotational directions (e.g., clockwise or counterclockwise) to attach or detach the nut 310 and the bolt 302. As an example, rotating the nut 310 in a first rotational direction further engages the threads and causes the nut 310 to move in a first axial direction along the shaft of the bolt; rotating the nut 310 in a second rotational direction opposite the first rotational direction further disengages the threads and causes the nut to move in a second axial direction opposite the first axial direction along the shaft of the bolt 302. The specific direction of rotation for attaching or detaching the nut 310 from the bolt 302 depends on the directionality of the threads. During installation of the nut 310 on the bolt 302 or detachment of the nut 310 from the bolt 302, the torque 320 may be applied in a single direction (e.g., only in the first rotational direction to install or only in the second rotational direction to detach). During installation, the torque 320 applied in the first rotational direction causes the threads on the nut 310 to engage with the threads on the shaft 302b of bolt. The threads engage with one another to guide relative rotational of the nut 310 relative to the shaft, which causes the nut 310 to advance axially along the shaft of the bolt 302 in a direction toward the portion of the aircraft 306 based on the relative rotation. Under normal installation conditions, the torque 320 causes the nut 310 to easily spin about the shaft 302b of the bolt 302. However, mechanical stoppages between threads on the nut 310 and threads on the bolt 302, which may be caused by misalignment and/or differences in manufacturing tolerances, can cause the nut 310 to stop or stick in one place. The nut 310 continues to move along the shaft 310b and, eventually, makes contacts with the aircraft component 308 (e.g., as shown in FIGS. 3C and 3D). The nut 310 and the bolt 302 couple the aircraft component 308 to the portion of the aircraft 306.

In FIGS. 3C and 3D, the system 300 is partially assembled and the nut 310 is partially installed. The nut 310 contacts the aircraft component 308. At this point, any torque applied to the nut in the first rotational direction creates tension in the shaft of the bolt, which applies a compressive force to attach the aircraft component 308 and the portion of the aircraft 306 to one another. Beyond a threshold level of torque, the compressive forces exerted by the head and the nut are such that that the nut stops advancing up the shaft of the bolt. When the nut 310 stops advancing along the shaft of the bolt 302, regardless of whether the stoppage is caused by the aforementioned torque constraints, contact with the aircraft component 308, a mechanical stoppage, and/or some other reason, the torque 320 is transferred from the nut 310 to the shaft 302b of the bolt 302. Without the fitting 304, or other fittings of the present disclosure, this transfer of the torque 320 causes the bolt 302 to rotate simultaneously with the nut 310. Such simultaneous rotation of the bolt 302 and the nut 310 prevents the relative rotation between the bolt 302 and the nut 310 necessary to cause the bolt 302 and the nut 310 to interlock and create the mechanical force to join the aircraft component 308 and the portion of the aircraft 306.

The fitting 304 solves a problem of the torque 320 in the first rotational direction causing the bolt 302 to rotate simultaneously with the nut 310. The head 302a of the bolt 302 nests between the flanges 404 and 408 while the shaft 302b of the bolt 302 extends through the opening 414 in the body of the fitting 304. Because the head 302a of the bolt 203 bears against the flanges 404 and 408, the torque applied to shaft 302b does not cause the bolt 302 to rotate independently of the fitting 304. Instead, the fitting 304 and the bolt 302 rotate simultaneously with one another.

The fitting 304 and the bolt 302 are operable to simultaneously rotate from a first angular position to a second angular position based on the torque applied to the shaft 302b of the bolt 302 and the contact between the flanges 404 and 408 of and the head 302a of the bolt 302. FIGS. 3C and 3D illustrate that the fitting 304, which measures the dimension $D_2$, fits within an area of the portion of the aircraft 306 that measures a dimension $D_1$, which may include a tolerance $T_{D1}$. In addition, the portion of the aircraft 306 includes rounded inside corners 317a and 317b. The dimension $D_1$ is greater than the dimension $D_2$. Thus, gaps 319a and 319b exist between the fitting 304 and a barrier, which in this case is the portion of the aircraft 306. The tapered lower portion of the fitting 304 provides a clearance to avoid the fitting prematurely making contact with the rounded inside corners 317a and 317b during rotation of the fitting. As shown in FIGS. 3C and 3D, the fitting 304 is at the first angular position at which the gap 319a separates the flange 402 from the portion of the aircraft 306 and the gap 319b separates the flange 406 from the portion of the aircraft. A distance L1 is measured between a center of the fitting 304 and an edge of the fitting (e.g., half of the distance $D_2$). A distance L2 is measured between the center of the fitting 304 and a corner of the fitting. The distance $w_1$ is measured between the flanges 404 and 408. The bolt head 302a is hexagonal in shape. The distance $w_2$ is measured between faces on opposite sides of the hexagonal shape of the head 302a. Each face of the head 302a has a length $w_3$. Each intersection between faces of the head 302a are rounded at a radius $R_2$, which includes a tolerance $T_{R2}$. The distance L3 is measured from the center point of the head 302a to the face along a line perpendicular to the face. Because the fitting 304 and the bolt 302 rotate collectively, they can rotate to an angular position where the fitting 304 contacts the barrier, at least in part, based on the geometry of the head 302a and the fitting 304.

Figure 3E:
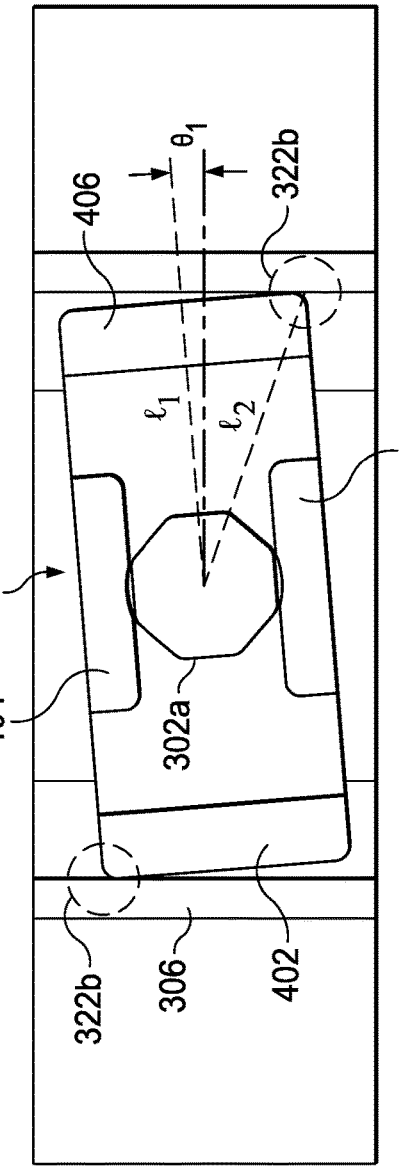

In the FIG. 3E, the fitting 304 is at the second angular position at which the flanges 406 and/or 402 contact the portion of the aircraft 306, as generally indicated by reference numerals 322a and 322b. The torque applied to the shaft of the bolt 302 rotated the fitting 304 and the bolt 302 by an angle $\theta_1$ from the first angular position (FIGS. 3C and 3D) to the second angular position (FIG. 3E). The angle $\theta_1$ represents a difference between the first angular position and the second angular position. Because the fitting 304 and the bolt 302 rotate together, the contact between the portion of the aircraft 306 and the flange(s) substantially limits further rotation of the bolt 302 in the first rotational direction. This contact, as generally indicated by reference numerals 322a and 322b, between the fitting 304 and the barrier, prevents rotation of the fastener by holding the fastener in place while the torque is applied to a shaft of the bolt to enable the relative rotation between the bolt 302 and the nut 310 needed to securely attach the aircraft component 308 to the portion of the aircraft 306. Advantageously, the contact provided by the fitting 304 prevents the problem of the bolt 302 merely spinning simultaneously with the nut 310 since the fitting 304 resists the torque and holds the bolt 302 in place. In addition, the fitting 304 enables a single person (e.g., without the help of a second person) to install the nut 310 on the bolt 302 and reach a desired amount of torque (e.g., measured in foot-pounds ("ft*lbs")). Because the fitting 304 holds the bolt 302, the second person is not needed to hold the bolt while installing the nut 310. Moreover, because the fitting 304 is physically restrained by opposing members of the bolt, as it is trapped between the head 302a and the nut 310, the fitting 304 is less likely to detach from the bolt than a backup wrench, for example. This physical restraint is present regardless of whether the nut is partially or fully engaged on the threads of the bolt and can prevent the fitting 304 from becoming a projectile and potentially cause damage to the aircraft and/or bodily harm to people therein. The fitting 304 will stay attached as long as the bolt 302 is in place and can only be removed if the bolt 302 is removed and/or ruptures and/or if the fitting 304 ruptures. After the fitting 304 is in place, a person no longer needs to repeatedly access the opposite ends of the bolt 302 because the fitting 304 supports the head of the bolt 302. Instead, the person can focus on installing the nut on the shaft of the bolt and can largely ignore the head of the bolt.

In some cases, a shape, size, and/or tolerances of the shape/size of a fitting as disclosed herein is designed to fit within a particular space of the aircraft in which the fitting is to operate. For example, a dimension of the fitting 304 (e.g., the dimension $D_2$) fits within a dimension of the portion of the aircraft 306 (e.g., the dimension $D_1$). The fitting may be designed to correspond to the space into which it must fit) according to a ratio. For example, a ratio of the dimension $D_2$ of the fitting 304 fits to the dimension $D_1$ of the portion of the aircraft 306 may be X:Y. The fitting is designed using geometric design and tolerances to ensure proper fit and function within its operating space. Surfaces of the flanges contact, e.g., flat sides of a head of a hex bolt and sides of the operating space to react installation torque from the outside of the aircraft. Advantageously, the relationship between the sizes and/or tolerances of the fitting and the space enable the fitting the stop rotation of fastener based on relatively small rotation of the fitting. In some examples of the fitting 304 (e.g., in the context of FIGS. 3A-3E) the fitting may rotate about 7 degrees (i.e., angle $\theta_1$ which measures the difference between the first angular position and the second angular position). Thus, in some examples, the fitting 304 may prevent rotation of the fastener based on the fitting rotating less than or equal to about seven degrees.

The dimension $D_2$ of the fitting 304 is governed by the expression E1 below. The fitting 304 fits within the area of the portion of the aircraft 306 that measures the dimension $D_1$ as long as the dimension $D_2$ satisfies the expression.

$$D_2 \leq D_1 - T_{D1} - T_{D2} \qquad \text{E1:}$$

In addition, the length L2 measured between the center of the fitting 304 and a corner of the fitting the fitting 304 is governed by the expression E2 below. When the length L2 satisfies the expression, the fitting will not freely spin within the area of the portion of the aircraft 306. Satisfying the expression E2 ensures that the fitting 304 contacts the portion of the aircraft 306 when it is at the second angular position.

$$\ell_2 \geq \frac{D_1}{2} + \frac{T_{D1}}{2} + \sqrt{\left(\frac{T_{D2}}{2}\right)^2 + \left(\frac{T_{D3}}{2}\right)^2} + R_1 + T_{R1} \qquad \text{E2}$$

The angle $\theta_1$ represents the difference between the first angular position and the second angular position, at which the fitting 304 contacts the portion of the aircraft 306. The Equation E3 below determines the angle $\theta_1$ based on the geometry of the fitting 304 and of the portion of the aircraft 306.

$$\theta_1 = \cos\left(\frac{D_2 - T_{D2}}{\ell_2}\right) - \cos\left(\frac{D_1 - T_{D1}}{\ell_2}\right) \qquad \text{E3}$$

In some cases, the angle $\theta_1$ of Equation E3 may be minimized as long as the expressions E1 and E2 are satisfied.

The bolt head 302a fits between the flanges of the fitting 304 based on the dimension $w_1$ satisfying the expression E4 below. When the dimension $w_2$ satisfies the expression E5 below, the bolt head 302a will not freely spin between the flanges and, instead, will contact the flanges of the fitting 304 and inhibit relative rotation between the fitting 304 and the bolt 302.

$$w_1 > w_2 + T_{w1} + T_{w2} \qquad \text{E4}$$

$$w_1 < \ell_2 - T_{w1} - R_2 - T_{R2} - \sqrt{\left(\frac{T_{w2}}{2}\right)^2 + \left(\frac{T_{w3}}{2}\right)^2} \qquad \text{E5}$$

FIGS. 3A-3D also illustrate that the bolt 302, when at least partially installed, encloses at least a portion of the fitting 304 between opposite ends of the bolt (i.e., between the head 302a of the bolt 302 and the nut 310). The fitting 304 is trapped between opposite ends of the shaft 302b of bolt 302 by two members (i.e., in this case, the head 302a of the bolt 302 and the nut 310). The bolt constrains opposite sides (e.g., top and bottom sides) of the fitting 304 between the head 302a of the bolt 302 and the nut 310. The bolt 302, when fully installed, applies a compressive force to the body 400 of the fitting 304 (e.g., the fitting 304 is compressed between the head 302a and the portion of the aircraft 306. The compressive force, at least in part, holds the fitting 304 in place.

Figure 5A:
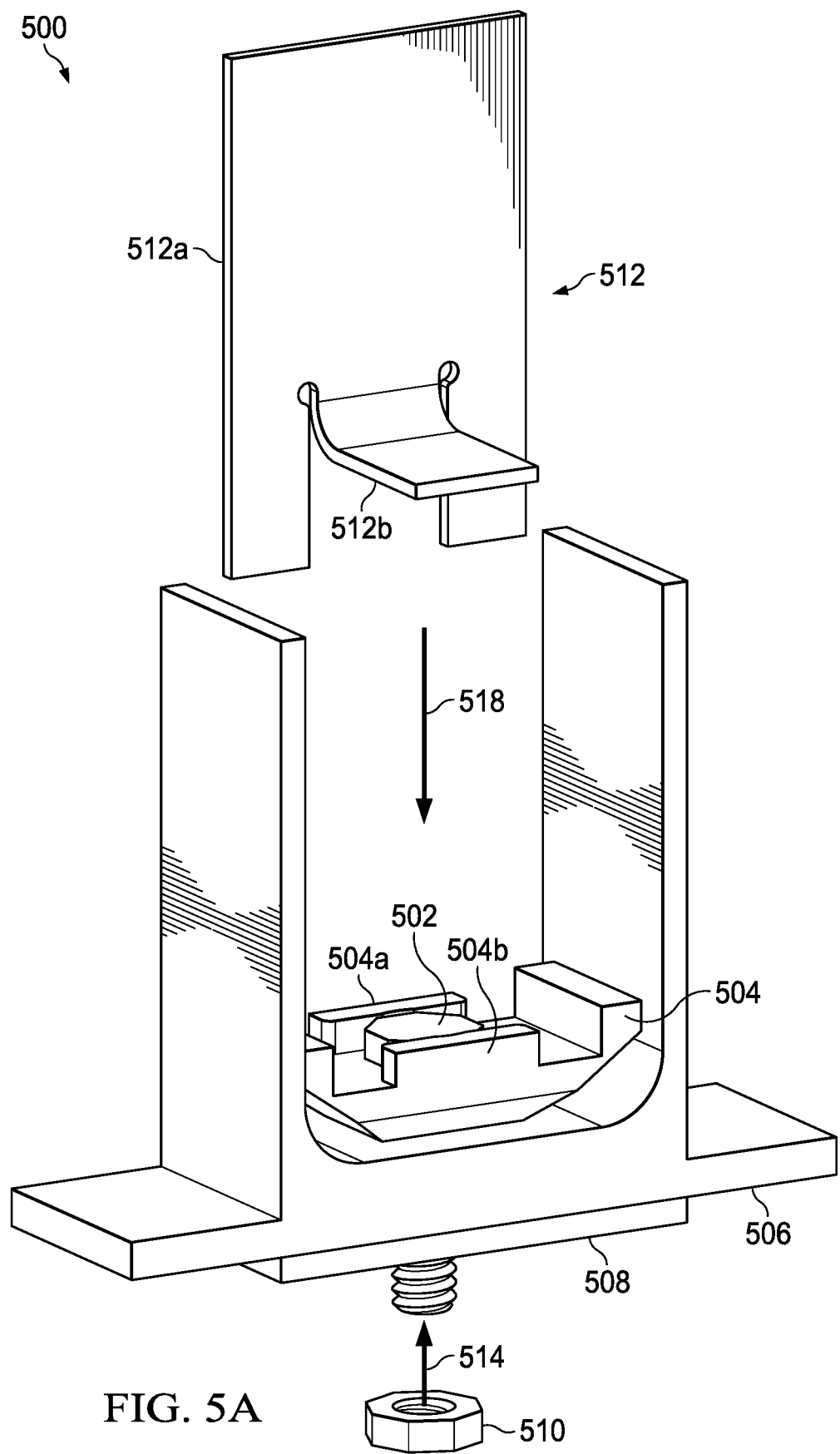
FIGS. 5A and 5B illustrate a system (including an attachment) for supporting a fastener in accordance with some embodiments.
Figure 5B:
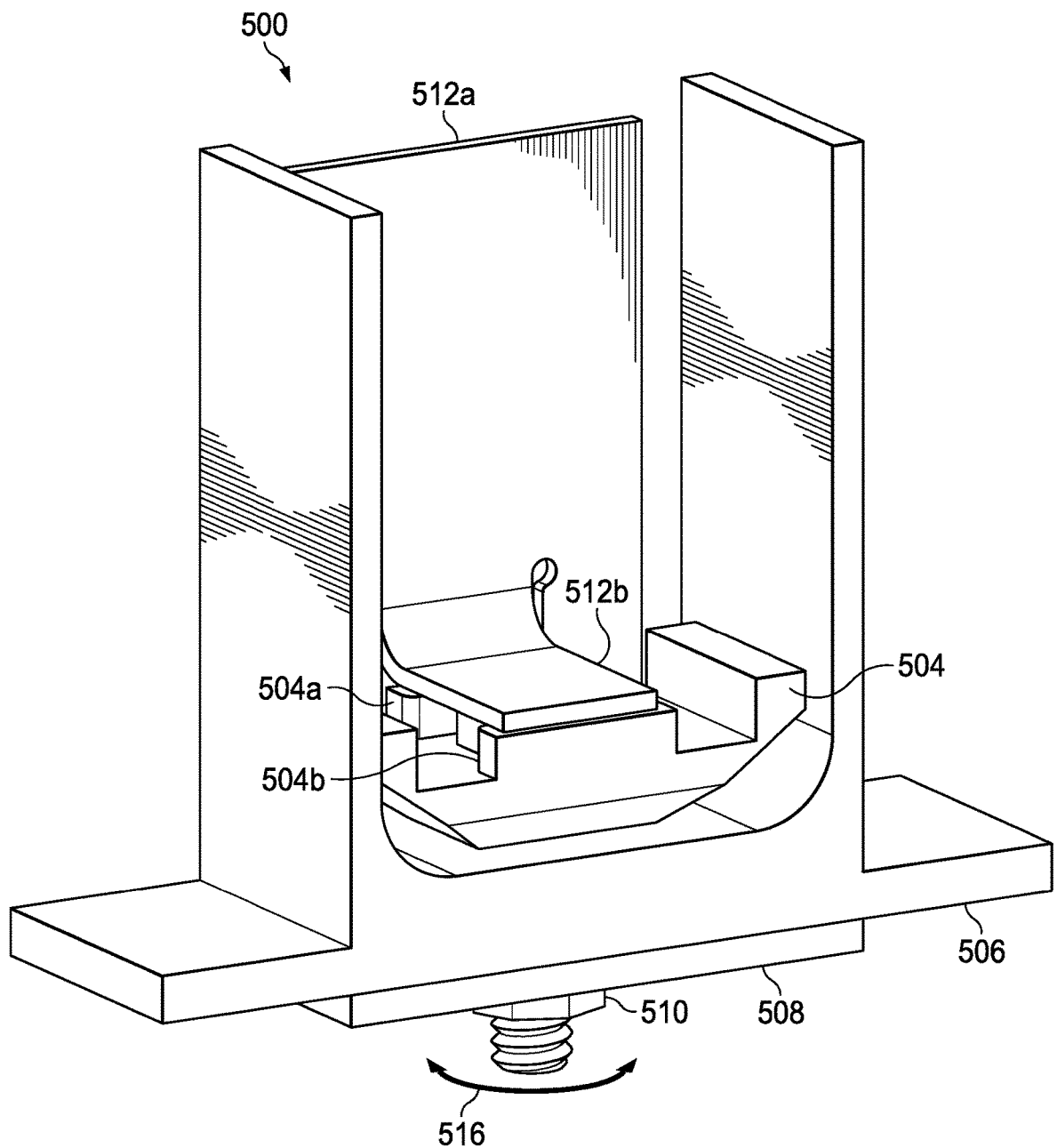

FIGS. 5A and 5B illustrate a system 500 for supporting a fastener in accordance with some embodiments. The system 500 comprises a bolt 502, a fitting 504, a portion of an aircraft 506, an aircraft component 508, and a nut 510. The system 500 of FIGS. 5A and 5B operates in a manner similar to that of the system 300 of FIGS. 3A-3E; a difference is that the system 500 is depicted with an attachment 512. The attachment 512 comprises plates 512a and 512b. The plate 512b extends from the 512a. In this example, the plates 512a and 512b are continuous with one another (e.g., formed from a single plate of material). In other examples, the plates 512a and 512b may be formed separately and joined to one another.

FIG. 5A illustrates the system 500 partially assembled and installed on an aircraft wherein the fitting 504, at least in part, supports the bolt 502; the nut 510 is not installed. The fitting 504 corresponds to the fitting 304 (e.g., described with respect to FIGS. 4A-4D). In operation, the attachment 512 is moved (e.g., as generally indicated by 518) to a position where it contacts the fitting 504 and/or the bolt 502. FIG. 5B illustrates the system 500 where the attachment 512 is positioned to contacts the fitting 504 and/or the bolt 502 and the nut 510 is installed. The attachment 512 is held in contact with the fitting 504 and/or the bolt 502 by an attachment mechanism coupling to the attachment 512 to a support structure. The location of the attachment 512 is fixed based on the attachment mechanism. The support structure may comprise the portion of the aircraft 506 or any other rigid component of the aircraft capable of supporting the attachment 512. In other cases, a plate (e.g., similar to the plate 512b) may be coupled to the fitting 504 (e.g., the fitting 504 having a plate, e.g., coupled to a flange of the fitting 504).

To install the nut 510, a force 514 is applied to move the nut 510 into contact with threads on a shaft of the bolt 502 and a torque 516 is applied to the nut 510 to engage the threads on the nut 510 with the threads on the shaft of the bolt 502. The force 514, which moves the nut 510 into contact with threads on a shaft of the bolt 502 can potentially cause the problem of the bolt falling out of the opening since no one and/or nothing is on the other side holding the bolt in place. Advantageously, the attachment 512 prevents the problem of the bolt 502 falling out of the opening since the attachment 512 resists the force 514 and, thereby, holds the bolt 502 in place. The plate 512b serves as a backstop for the bolt 502 and holds the bolt 502 in place when the force 514 could otherwise cause the bolt to be pushed out of the assembly. The fitting 504 prevents the problem of the bolt 502 merely spinning simultaneously with the nut 510 since it resists the torque other side holding the bolt in place the bolt from free spinning with the nut when the torque is applied for installation.

Figure 6A:
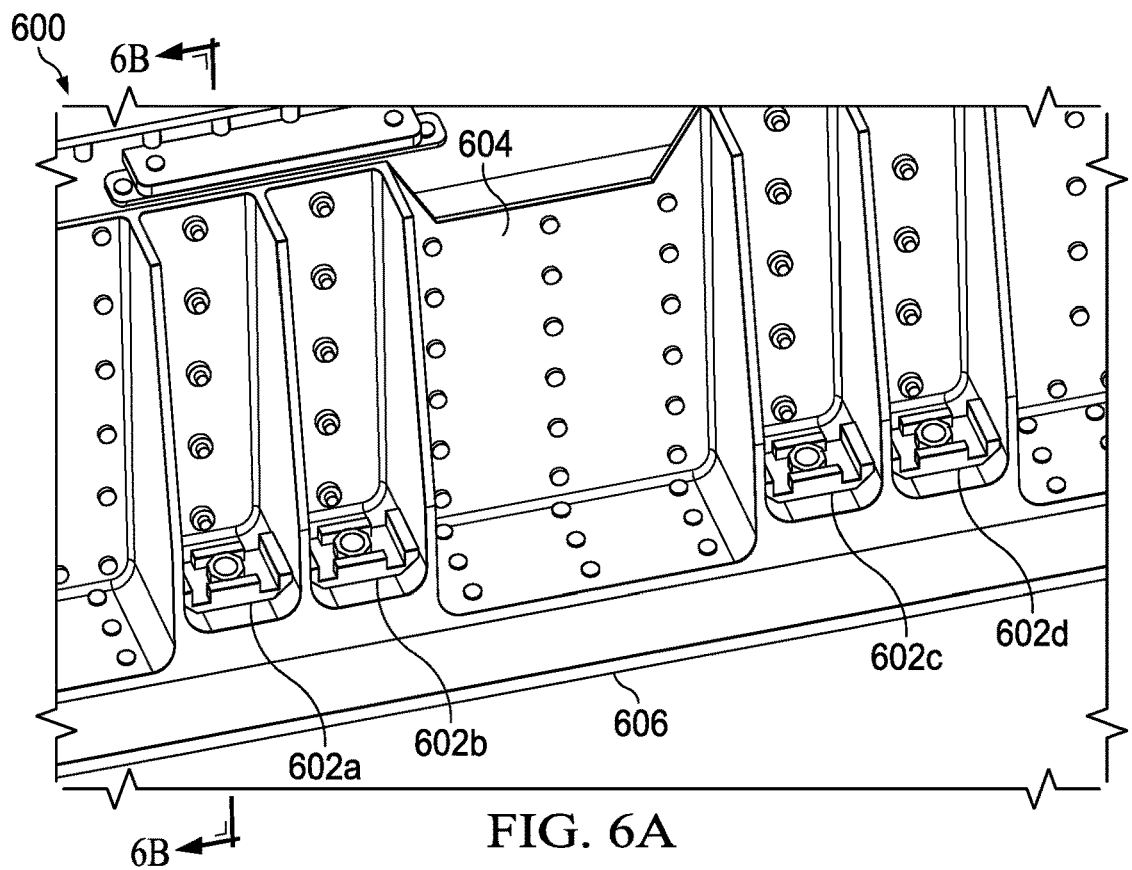
Figure 6B:
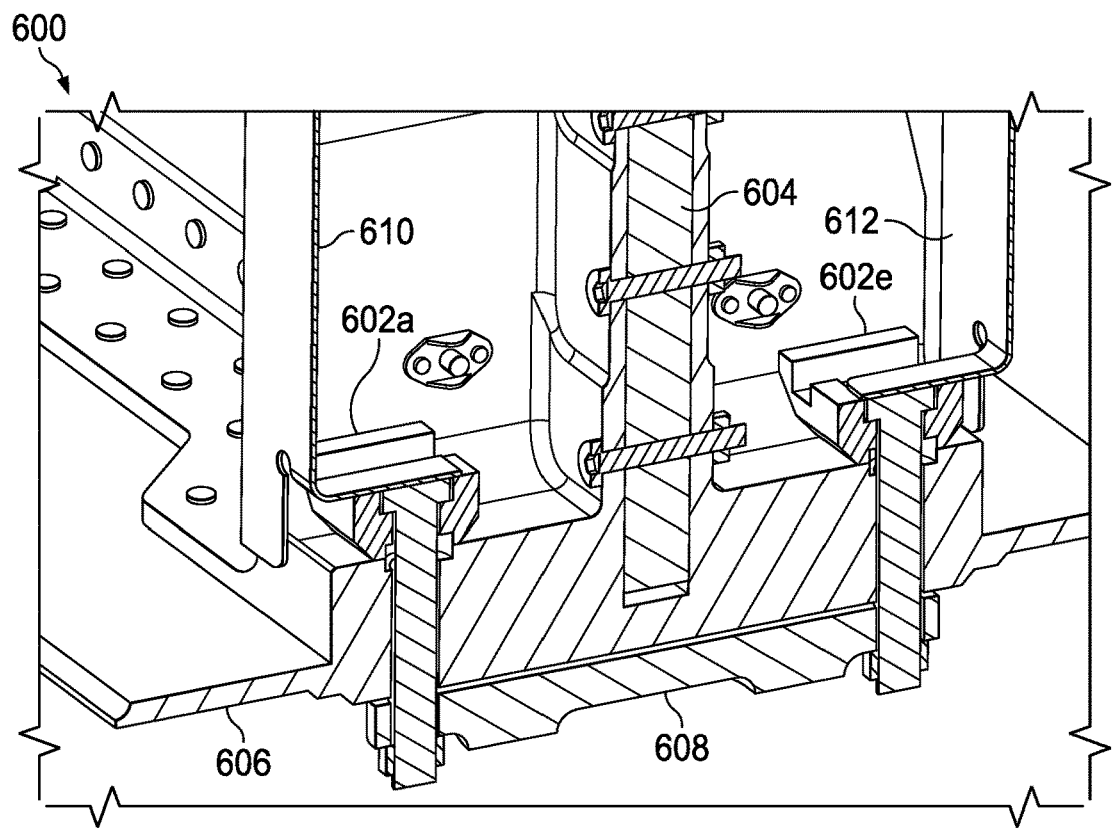

FIGS. 6A and 6B illustrate a system 600 for supporting a fastener in accordance with some embodiments. The system 600 comprises a surface 606 of an aircraft, a structural support 604, a plurality of bolts supported by a corresponding plurality of fittings 602a-602h, a plurality of attachments, such as attachments 610 and 612, and an external component 608. The surface 606 of the aircraft is attached to and is supported by the structural support 604. The surface 606 is an outer surface of the aircraft including at least a portion of an outer mold line of the aircraft. The structural support 604 is inside of the aircraft. The structural support 604 is a portion of the aircraft (e.g., a portion of the rotorcraft 101 of FIGS. 1A and 1B and/or a portion of the tiltrotor aircraft 201 of FIG. 2). The plurality of fittings 602 and the corresponding bolts attach the external component 608 to the aircraft. Each of the plurality of attachments shown in FIG. 6B supports a different one of the plurality of bolts to prevent the problem of a bolt being pushed out of its opening during installation of a nut on the bolt. Each of plurality of attachments is attached to the structural support 604.

The FIG. 6A shows a view of one side of the structural support 604 as viewed from the inside of the aircraft. The fittings 602a, 602b, 602c, and 602d are visible in the view depicted in FIG. 6A. The other side of the structural support 604 (not visible in FIG. 6A) includes four additional fittings 602e, 602f, 602g, and 602h, that mirror the respective locations of the fittings 602a, 602b, 602c, and 602d. In total, eight fittings are attached to the structural support 604.

The FIG. 6A shows a cross section through the system 600, as generally indicated by a line labeled "6B" in FIG. 6A. The cross section cuts through both sides of the structural support 604, the fittings 602a and 602e and respective bolts, the external component 608, and the attachments 610 and 612. Plate portions of each of the attachments 610 and 612 provide support to prevent the corresponding bolts from being pushed out of openings in the aircraft. Each of the fittings 602 is at least in part enclosed between opposite ends of its corresponding bolt. Each of the fittings 602 are pinned directly between the head of a bolt and a surface of the structural support 604.

During installation, a single maintenance person (e.g., without assistance from another person) may install each of the fittings 602 and the corresponding bolts. For example, from an inside of the aircraft, an opening in each fitting is aligned with an opening in the aircraft, including openings in the structural support 604 and the surface 606, and a shaft of the corresponding bolt is inserted through the openings. The bolt is pushed through the openings until a head of the bolt is nested within flanges of the fitting, which is inside of the aircraft. The head of the bolt is inside the aircraft and the shaft of the bolt extends through the structural support 604 and the surface 606 to the outside of the aircraft. Thus, each bolt extends from the inside of the aircraft to the outside of the aircraft through a corresponding fitting. After the bolt and fittings are in place (e.g., as depicted in FIGS. 3B and/or 5A), the maintenance person may move from inside the aircraft to outside the aircraft. The openings in the external component 608 are aligned with the bolts and nuts are installed on the shaft of each bolt by applying a torque to the nut when in contact with the shaft of the bolt. A nut is installed on each bolt from the outside of the aircraft. Because each of the fittings 602 supports a corresponding bolt, the fittings 602 resists the torque applied to the shaft of the bolt via the nut during installation. When the nut is fully installed (e.g., reaches a threshold amount of torque), each bolt applies a compressive force to the at least a portion of the fitting. To remove each of the fittings 602, the corresponding nuts and bolts must be removed first. The fittings 602 are not removable without first removing the corresponding nuts and bolts. The fittings 602 remain in place while the aircraft is in operation (e.g., during take-off, landing, and/or flight).

Advantageously, the single maintenance person can install, remove, and/or and replace each of the nuts from the outside of the aircraft because of the support provided by the fittings 602. For example, the nut can be repeatedly removed and/or replaced while remaining on the outside of the aircraft and without assistance from another person on the inside of the aircraft. The fittings 602 also enables the maintenance person to attach, remove, and/or and replace the external component 608, which are attached by the bolts and nuts, while remaining on the outside of the aircraft and without assistance from another person on the inside of the aircraft. In addition, the nuts and bolts holding the fittings 602 in place prevents the fittings 602 from detaching from the aircraft based on vibrations during flight and becoming a projectile, potentially causing damage to the aircraft and/or bodily harm to people therein.

Figure 7B:
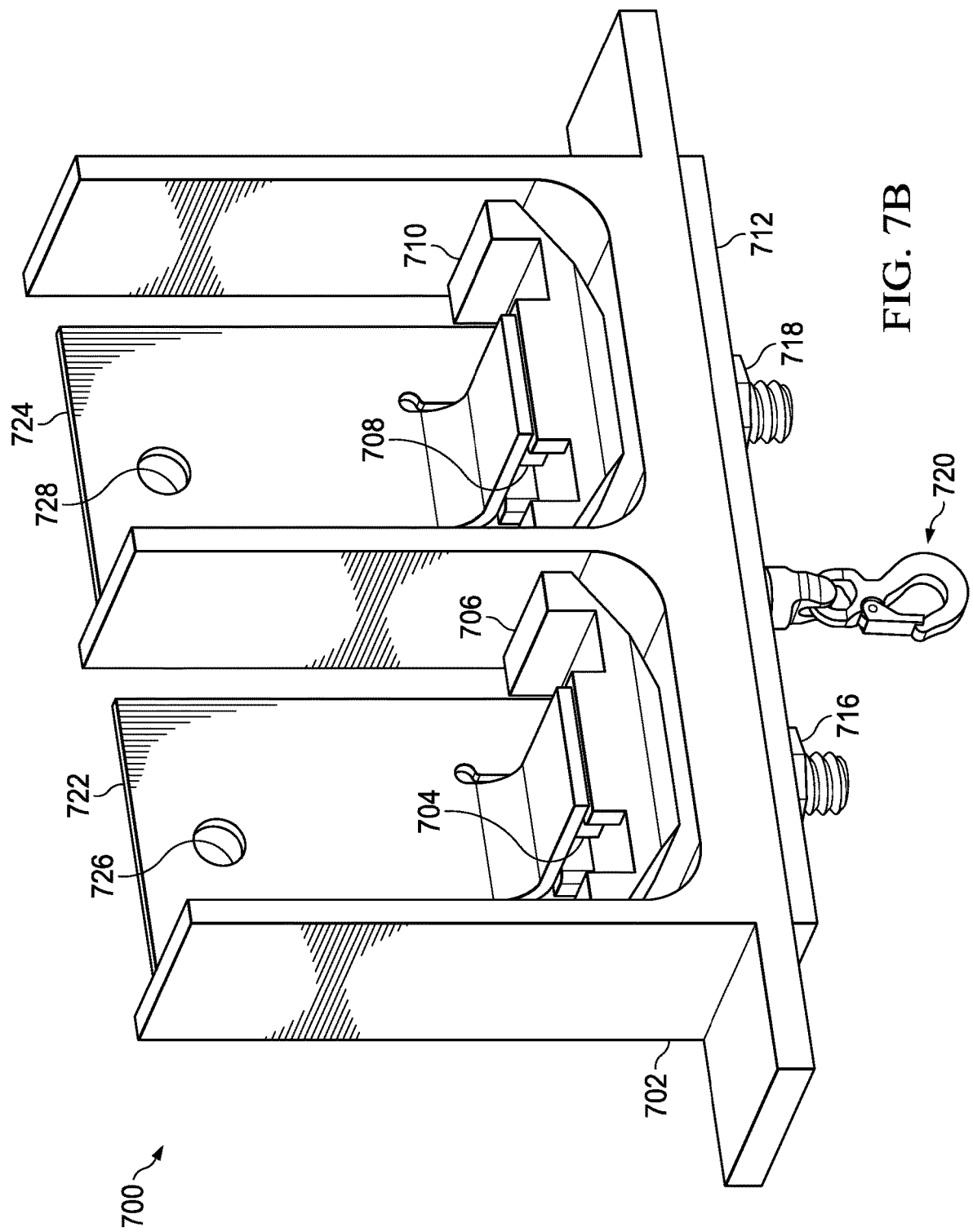

FIGS. 7A and 7B illustrate a system 700 for supporting a fastener in accordance with some embodiments. The system 700 comprises a portion of an aircraft 702, bolts 704 and 708 supported by corresponding fittings 706 and 710 respectively, attachments 722 and 724, and a hook assembly. The hook assembly includes a hook mechanism which is attached to a plate 712. The bolts 704 and 708 and the nuts 716 and 718 attach the hook assembly to the portion of an aircraft 702. The attachments 722 and 724 supports the bolts 704 and 708 respectively and prevent the bolts from being pushed of their openings during installation of the nuts 716 and 718. The attachments 722 and 724 include openings 726 and 728 respectively to enable the attachments to be affixing to the aircraft. In some embodiments, the attachments 722 and 724 may be coupled to one another.

Figure 8:
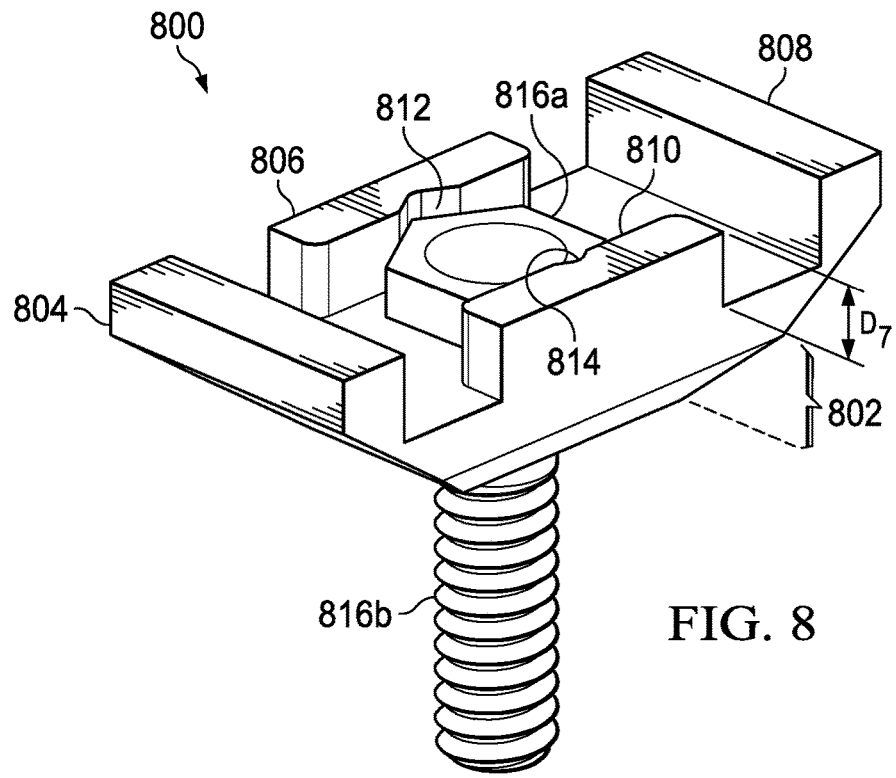
FIGS. 8 and 9 illustrate several apparatuses for supporting a fastener according to some embodiments of the present disclosure.
Figure 9:
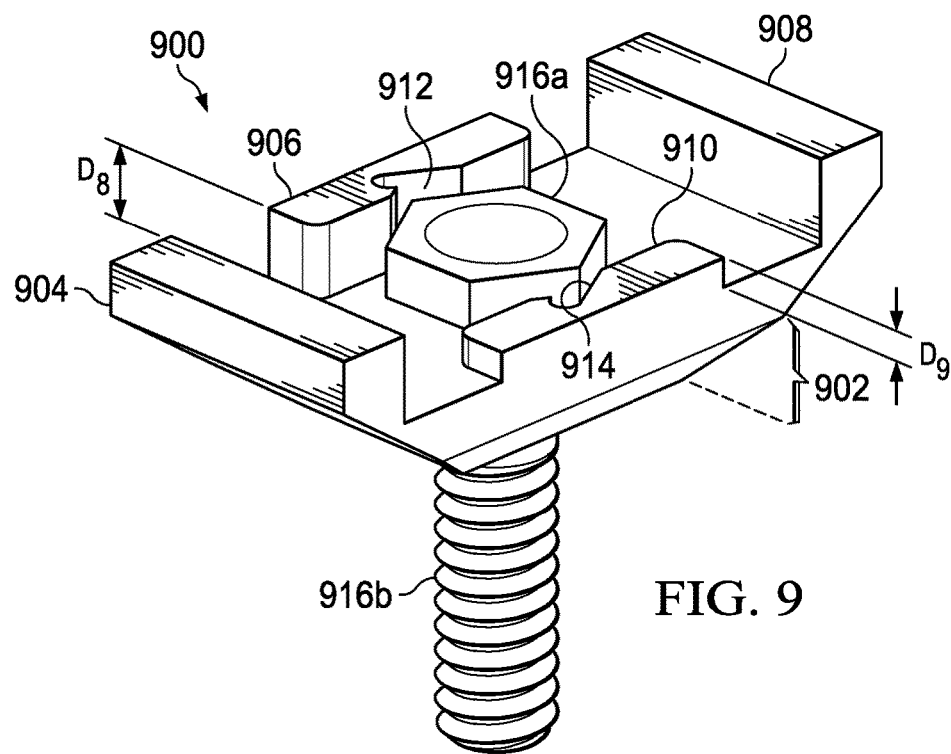

FIGS. 8 and 9 illustrate variations of several features of a fitting for supporting a fastener according to some embodiments of the present disclosure. For example, features of flanges, such as size, shape, bearing surface, height, width, and the like, can vary greatly between different embodiments of the present disclosure. FIGS. 8 and 9, which are described in further detail below, provide some non-limiting examples.

FIG. 8 is a three-dimensional view of a fitting 800. The fitting 800 is configured to support at least a portion of a fastener 816, including a head 816a and a shaft 816b, and is configured to limit rotation of the fastener when a torque is applied to the fastener. The fitting 800 comprises a body 802 and a plurality of flanges extending from a surface of the body 802. An opening extends through the body 802 through which fastener 816 extends. The plurality of flanges includes a flange 804, a flange 806, a flange 808, and a flange 810. Each of the plurality of flanges extend above the surface of the body 802 a dimension $D_7$. The flanges 804 and 808 are to contact an adjacent barrier. The flanges 806 and 810 are designed to contact at least a portion of a fastener 816. The flange 806 includes a faceted notch 812 with a rounded apex. The flange 810 includes a faceted notch 814 with a rounded apex. These faceted notches are bearing surfaces that facilitate the respective flanges grasping the fastener. In some embodiments, each the flanges 804-810 are interconnected to form a single flange around the perimeter of the fitting 800. The fitting 800 tapers from larger dimensions to smaller dimensions. The larger upper portion of the fitting 800 accommodates the head of a fastener and the tapered lower portion provides a clearance between adjacent components to avoid prematurely making contact with the adjacent components during rotation of the fitting 800. In addition, the lower portion provides structural support for the forces that the fitting supports during operation, such as the weight of an external component and/or compressive forces from a fastener. The fitting 800 can operate in a manner similar to other fittings of the present disclosure, such as the fitting 304.

FIG. 9 is a three-dimensional view of a fitting 900. The fitting 900 is configured to support at least a portion of a fastener 916, which include a head 916a and a shaft 916b, and is configured to limit rotation of the fastener when a torque is applied to the fastener. The fitting 900 comprises a body 902 and a plurality of flanges extending from a surface of the body 902. An opening extends through the body 902 through which fastener 916 extends. The plurality of flanges includes a flange 904, a flange 906, a flange 908, and a flange 910. Each of the flanges 904, 906, and 908 extend above the surface of the body 902 by a dimension $D_8$. The flange 910 extends above the surface of the body 902 by a dimension $D_9$. The dimension $D_9$ is less than the dimension $D_8$. The flanges 904 and 908 are to contact an adjacent barrier. The flanges 906 and 910 are configured to contact at least a portion of a fastener. The flange 906 includes a corner relief notch 912. The flange 910 includes a corner relief notch 914. Each corner relief notch includes a corner relief, which is the deepest recess of the notch that provides clearance for the corners of the head of the bolt to rotate and allows the flat surfaces of the bolt to make contact with flat surfaces of the notch. The corner relief notches grasp the head 916a of the fastener to prevent relative rotation of the fastener 816 with respect to the fitting 900. The fitting 900 tapers from larger dimensions to smaller dimensions. Advantageously, the larger upper portion of the fitting 900 accommodates the head of a fastener and the tapered lower portion provides a clearance between adjacent components to avoid prematurely making contact with the adjacent components during rotation of the fitting 900. In addition, the lower portion provides structural support for the forces that the fitting supports during operation, such as the weight of an external component and/or compressive forces from a fastener. The fitting 900 can operate in a manner similar to other fittings of the present disclosure, such as the fitting 304.

Some figures of the present disclosure (e.g., FIGS. 3A, 3B, 3C, 3D, 3E, 5A, 5B, 6A, 6B, 7A, 7B) illustrate fittings in same orientation only for simplicity and clarity of the Figures. The fittings of the present disclosure are operable when installed in the particular orientation shown in those Figures and in any other orientation (e.g., upside down, sideways) as needed for the orientation of the part. For example, on the rotorcraft of FIGS. 1A and 1B, the external component 113 is attached to a bottom of the rotorcraft 101; the external components 115 and 117 are attached to a top of the rotorcraft 101; and the external component 119 is attached to a side of the rotorcraft 101. Thus, a fitting installed with external component 113 would be, for example, in the orientation shown in FIG. 3C. A fitting installed with the external components 115 and 117 would be rotated upside down (e.g., about 180 degrees) relative to the orientation shown in FIG. 3C. Similarly, a fitting installed with the external component 119 would be rotated sideways (e.g., about 90 degrees) relative to the orientation shown in FIG. 3C. Advantageously, the fittings of the present disclosure can prevent unwanted rotation of the regardless of the orientation the fitting.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. An assembly to support a fastener, the assembly comprising:
   a barrier comprising at least a portion of a structure to which the assembly and fastener are installed; and
   a fitting comprising:
      a support surface, wherein at least a portion of the support surface is enclosable between opposite ends of the fastener; and
      a first flange and a second flange extending from the support surface, wherein the first flange is perpendicular to the second flange; and
   wherein the fitting is operable to rotate from a first angular position to a second angular position based on contact between the first flange and the fastener and a torque applied to the fastener, and
   wherein:
      in the first angular position, a gap separates the second flange from the barrier, and
      in the second angular position, the second flange is operable to prevent rotation of the fastener based on contact between the barrier and the second flange.

2. The assembly of claim 1, wherein the fastener is configured to enclose at least a portion of the support surface of the fitting between opposite ends of the fastener.

3. The assembly of claim 2, wherein the support surface of the fitting comprises an opening, and the fastener extends through the opening.

4. The assembly of claim 1, wherein the fastener comprises a shaft, a head attached to the shaft, and a nut operable to couple to the shaft.

5. The assembly of claim 4, wherein the first flange is operable to contact the head of the fastener, and wherein the nut is operable to apply the torque to the shaft of the fastener.

6. The assembly of claim 1, wherein the first flange and the second flange are located around an opening in the support surface of the fitting.

7. The assembly of claim 1, wherein a difference between the first angular position and the second angular position is less than or equal to seven degrees.

8. The assembly of claim 1, wherein the barrier comprises at least a portion of an aircraft.

9. An aircraft comprising:
   an aircraft component;
   a fastener operable to attach the aircraft component to the aircraft; and
   an apparatus operable to support the fastener, the apparatus comprising:
      a surface, wherein at least a portion of the surface is enclosable between opposite ends of the fastener;
      a first flange and a second flange extending from the surface, wherein the first flange is perpendicular to the second flange; and
   wherein the apparatus is operable to rotate from a first angular position to a second angular position based on contact between the first flange and the fastener and a torque applied to the fastener, and
   wherein:
      in the first angular position, a gap separates the second flange from a barrier comprising at least a portion of the aircraft component, and
      in the second angular position, the second flange is operable to prevent rotation of the fastener based on contact between the barrier and the second flange.

10. The aircraft of claim 9, wherein the fastener is operable to enclose at least a portion of the surface of the apparatus between opposite ends of the fastener.

11. The aircraft of claim 10, wherein the surface of the apparatus comprises an opening, and the fastener extends through the opening in the surface of the apparatus.

12. The aircraft of claim 9, wherein the fastener comprises a shaft, a head attached to the shaft, and a nut operable to couple to the shaft.

13. The aircraft of claim 12, wherein the first flange is operable to contact the head of the fastener, and wherein the nut is operable to apply the torque to the shaft of the fastener.

14. A system comprising:
   an aircraft component;
   a fastener operable to attach the aircraft component to an aircraft;
   a fitting operable to support the fastener, the fitting comprising:
      a surface, wherein at least a portion of the surface is enclosable between opposite ends of the fastener;
      a first flange and a second flange extending from the surface, wherein the first flange is perpendicular to the second flange; and
      wherein the fitting is operable to rotate from a first angular position to a second angular position based on contact between the first flange and the fastener and a torque applied to the fastener, and
   wherein:
      in the first angular position, a gap separates the second flange from a barrier comprising at least a portion of the aircraft component, and in the second angular position, the second flange is operable to prevent rotation of the fastener based on contact between the barrier and the second flange.

15. The system of claim 14, wherein the fastener is operable to enclose at least a portion of the surface of the fitting between opposite ends of the fastener.

16. The system of claim 15, wherein the surface of the fitting comprises an opening, and the fastener extends through the opening in the surface of the fitting.

17. The system of claim 14, wherein the fastener comprises a shaft, a head attached to the shaft, and a nut operable to couple to the shaft.

18. The system of claim 17, wherein the first flange is operable to contact the head of the fastener, and wherein the nut is operable to apply the torque to the shaft of the fastener.

* * * * *